United States Patent
Cho et al.

(10) Patent No.: US 10,681,538 B2
(45) Date of Patent: Jun. 9, 2020

(54) METHOD AND APPARATUS FOR TRANSMITTING AND RECEIVING DATA BY TERMINAL IN WIRELESS COMMUNICATION SYSTEM

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/077,447

(22) PCT Filed: Feb. 10, 2017

(86) PCT No.: PCT/KR2017/001484
§ 371 (c)(1),
(2) Date: Aug. 10, 2018

(87) PCT Pub. No.: WO2017/138770
PCT Pub. Date: Aug. 17, 2017

(65) Prior Publication Data
US 2019/0053045 A1 Feb. 14, 2019

Related U.S. Application Data

(60) Provisional application No. 62/293,774, filed on Feb. 11, 2016, provisional application No. 62/305,541, (Continued)

(51) Int. Cl.
*H04W 68/00* (2009.01)
*H04W 8/26* (2009.01)
(Continued)

(52) U.S. Cl.
CPC ............ *H04W 8/26* (2013.01); *H04W 68/00* (2013.01); *H04W 68/02* (2013.01); *H04W 76/20* (2018.02)

(58) Field of Classification Search
CPC ...................................... H04W 68/00
See application file for complete search history.

(56) References Cited

U.S. PATENT DOCUMENTS

| 9,763,179 | B2 * | 9/2017 | Pragada | H04W 12/06 |
| 2012/0184205 | A1 * | 7/2012 | Luft | H04W 52/02 455/9 |
| 2014/0219178 | A1 * | 8/2014 | Lopez | H04W 12/08 370/328 |

FOREIGN PATENT DOCUMENTS

| EP | 1981224 A1 * | 10/2008 | ............ H04W 76/38 |
| EP | 2271168 A1 * | 1/2011 | ............ H04W 76/38 |

(Continued)

OTHER PUBLICATIONS

PCT International Application No. PCT/KR2017/001484, International Search Report dated May 25, 2017, 3 pages.

(Continued)

*Primary Examiner* — Shantell L Heiber
(74) *Attorney, Agent, or Firm* — Lee Hong Degerman Kang Waimey

(57) ABSTRACT

The present invention relates to a method and an apparatus for a first mobility management entity (MME) to activate a terminal in a wireless communication system. According to the present invention, it is possible to provide a method and an apparatus of receiving a notification message transmitted from a service gateway (S-GW) to a terminal managed by the first mobility management entity, for notifying an occurrence of a first downlink data; determining whether there exists at least one terminal linked with the terminal on a basis of a first context information of the terminal; and (Continued)

performing a paging procedure for transitioning the terminal and the at least one terminal to a connection state when the at least one terminal linked to the terminal exists.

14 Claims, 18 Drawing Sheets

Related U.S. Application Data filed on Mar. 9, 2016, provisional application No. 62/348,955, filed on Jun. 12, 2016, provisional application No. 62/351,278, filed on Jun. 16, 2016, provisional application No. 62/353,035, filed on Jun. 22, 2016.

(51) Int. Cl.
*H04W 68/02* (2009.01)
*H04W 76/20* (2018.01)

(56) References Cited

FOREIGN PATENT DOCUMENTS

| | | |
|---|---|---|
| EP | 2728947 | 5/2014 |
| EP | 2892289 | 7/2015 |
| EP | 2897430 | 7/2015 |
| KR | 1020090045344 | 5/2009 |
| KR | 1020130061738 | 6/2013 |
| KR | 1020130095826 | 8/2013 |
| KR | 1020150058187 | 5/2015 |
| WO | 2011141154 | 11/2011 |

OTHER PUBLICATIONS

Ekstrom, H., "QoS Control in the 3GPP Evolved Packet System", IEEE Communications Magazine, LTE—3GPP Release 8, Feb. 2009, 10 pages.

European Patent Office Application Serial No. 17750462.8, Search Report dated May 31, 2019, 10 pages.

* cited by examiner

[FIG. 1]
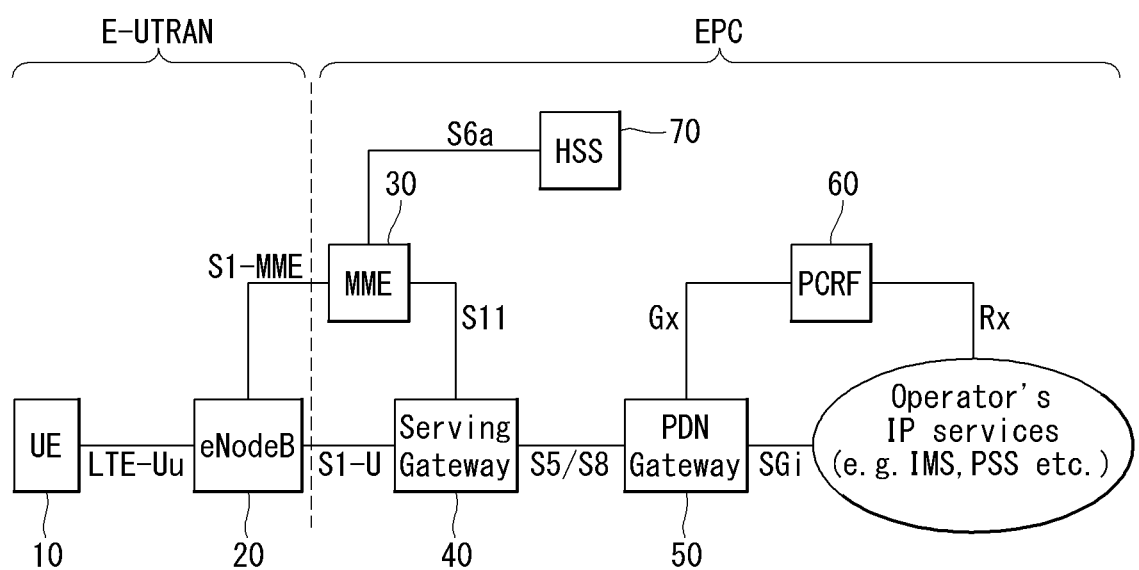

[FIG. 2]
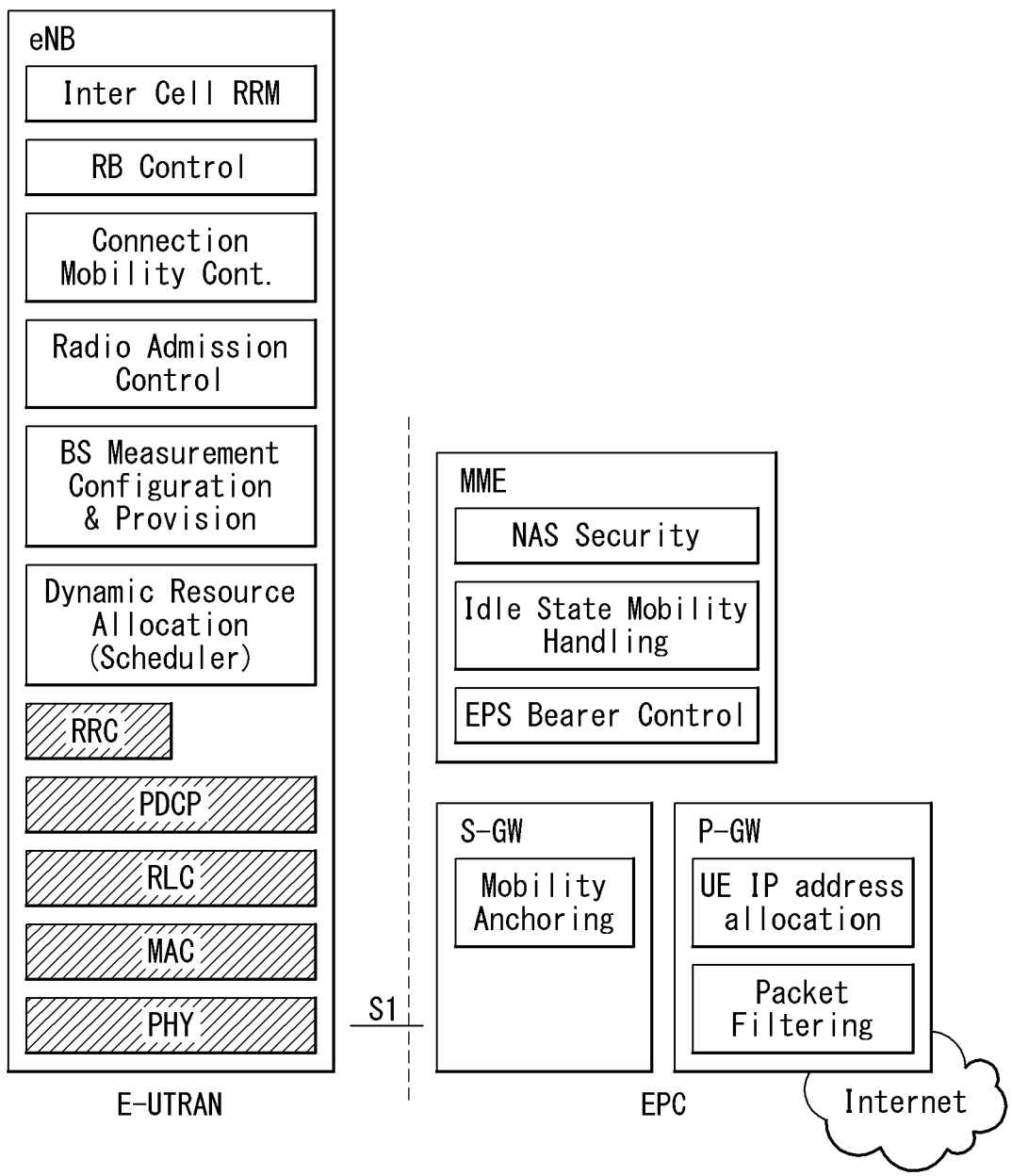

[FIG. 3]
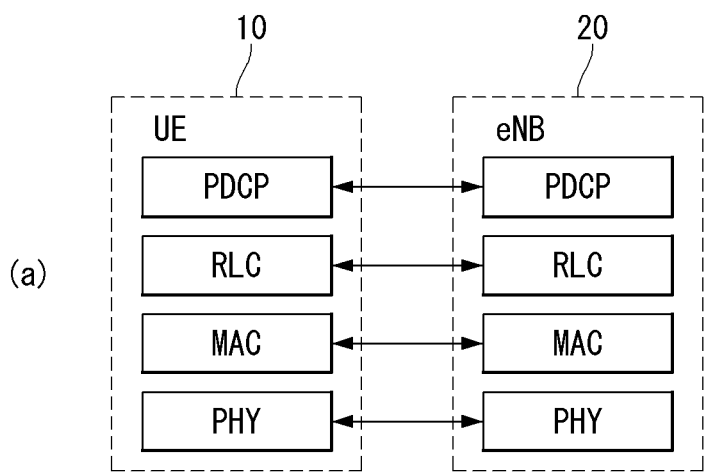
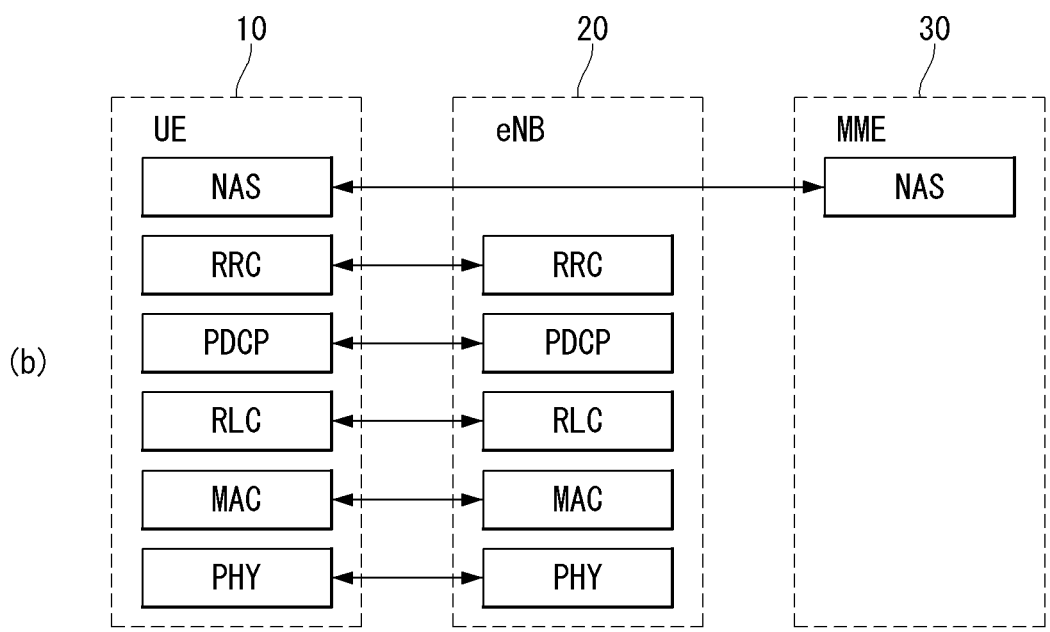

[FIG. 4]
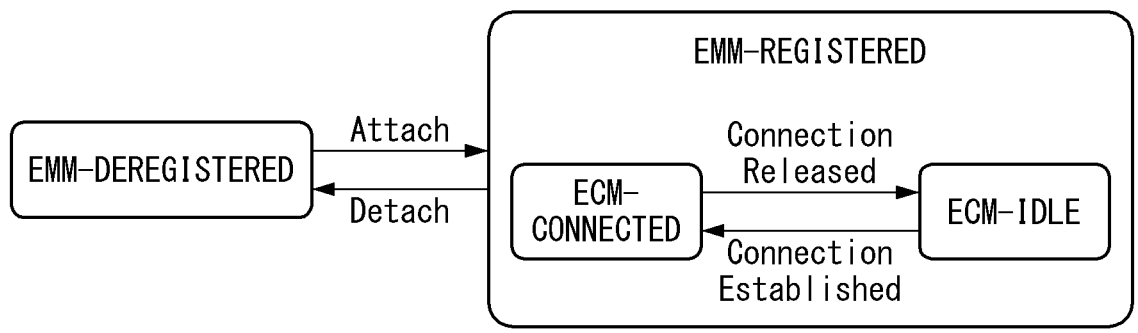
[FIG. 5]
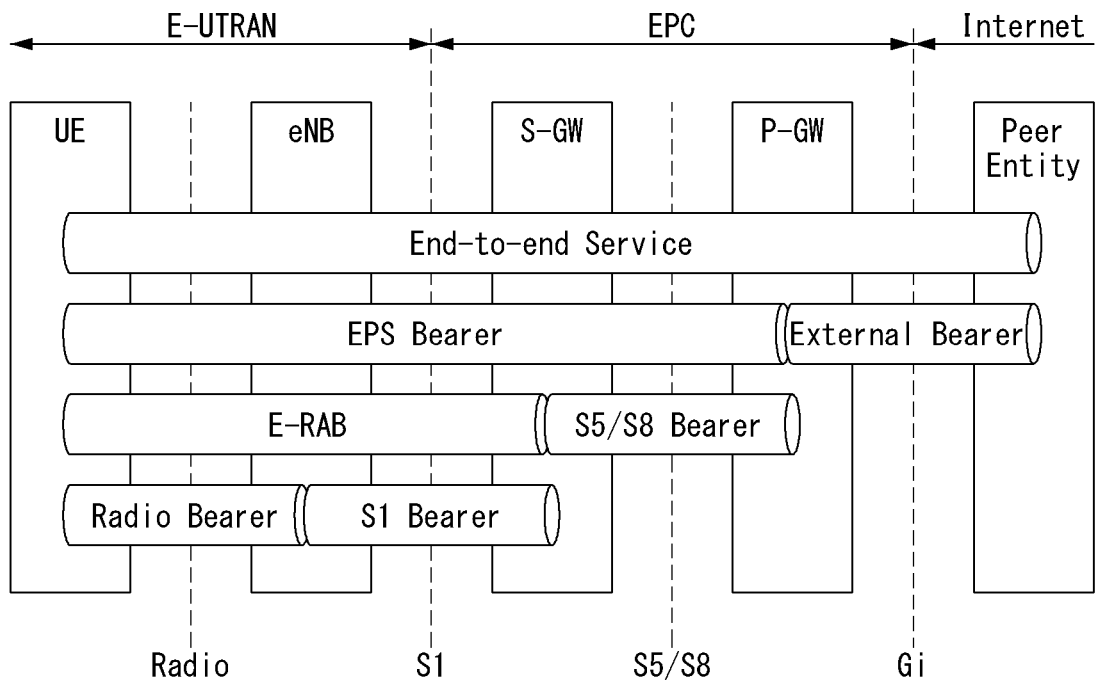

[FIG. 6]
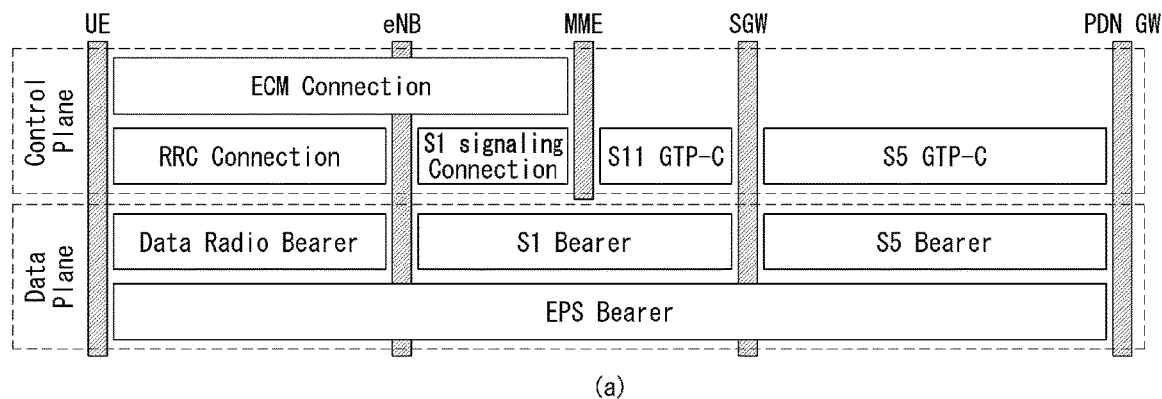
(a)
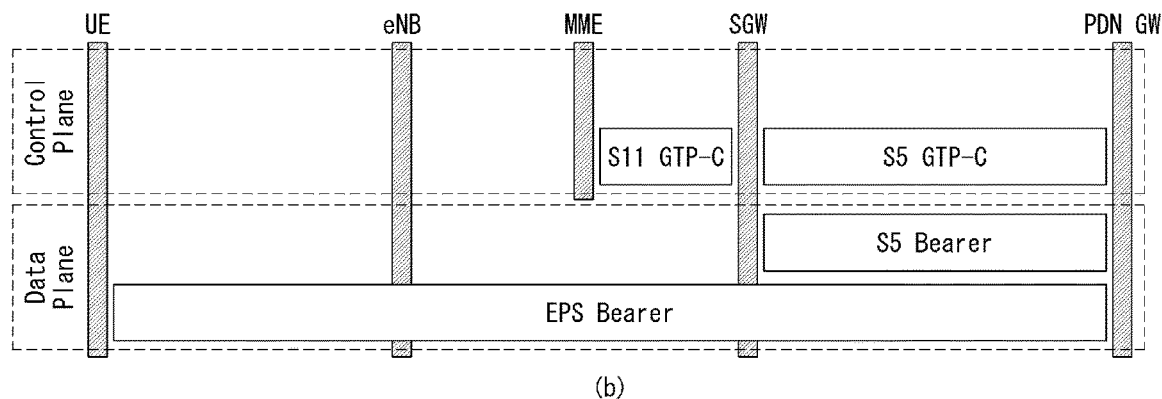
(b)

[FIG. 7]
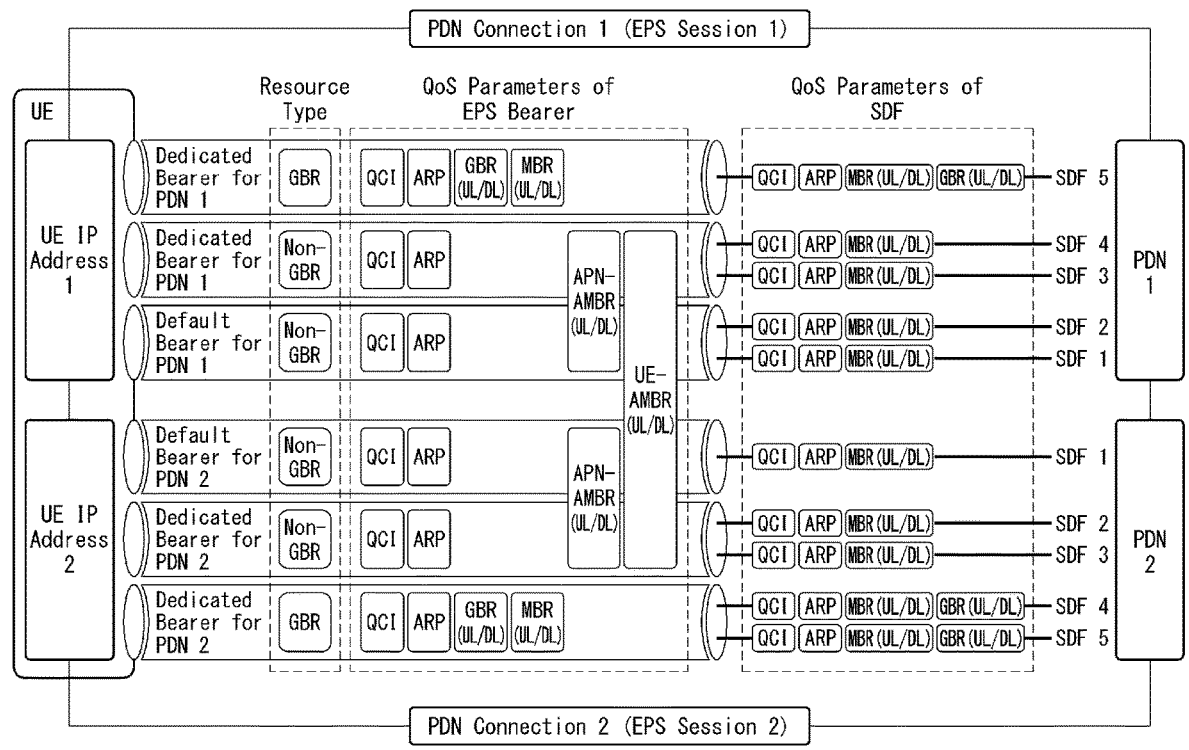

[FIG. 8]
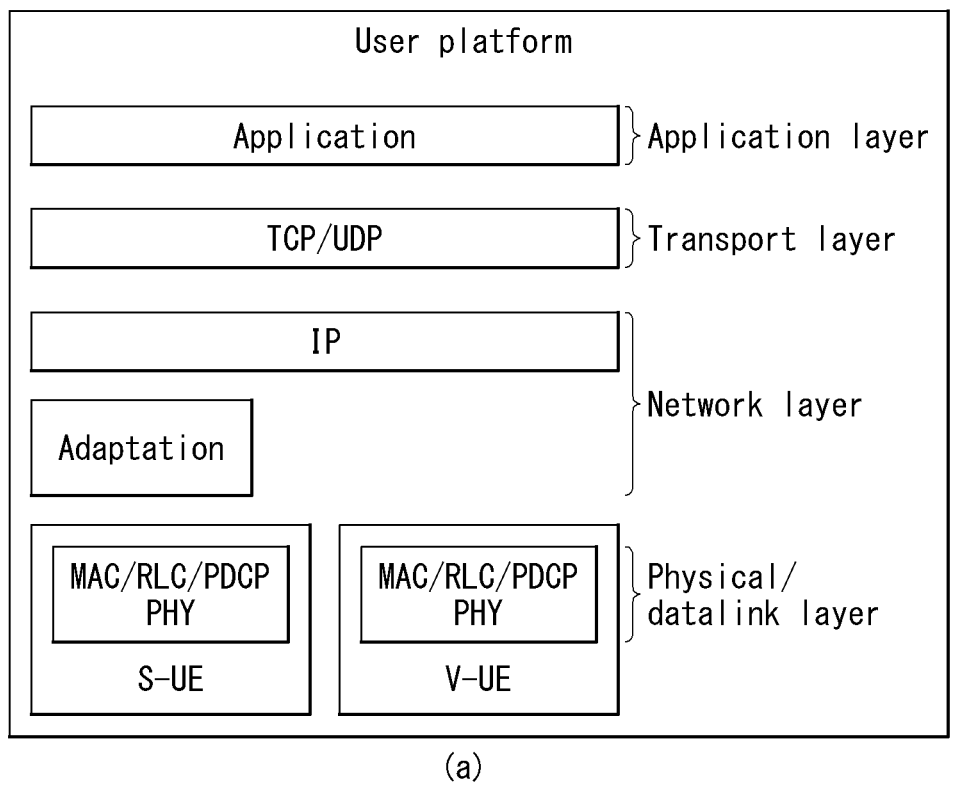
(a)
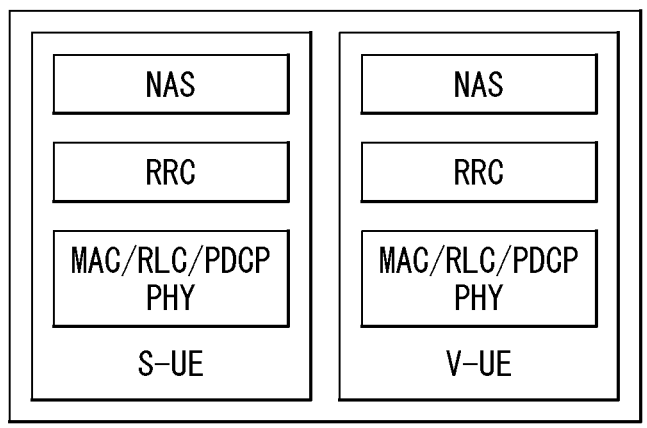
(b)

[FIG. 9]
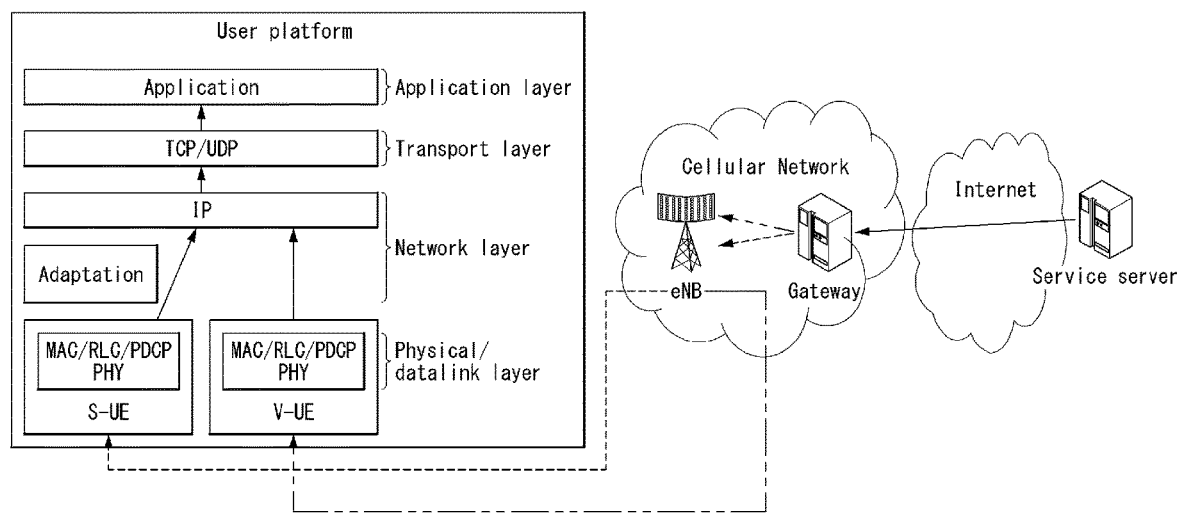

[FIG. 10]
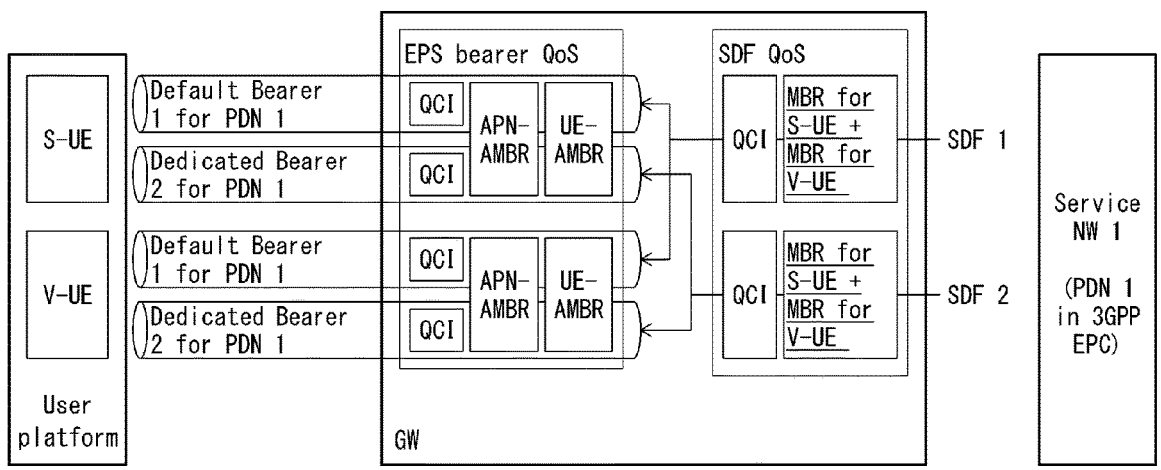

[FIG. 11]
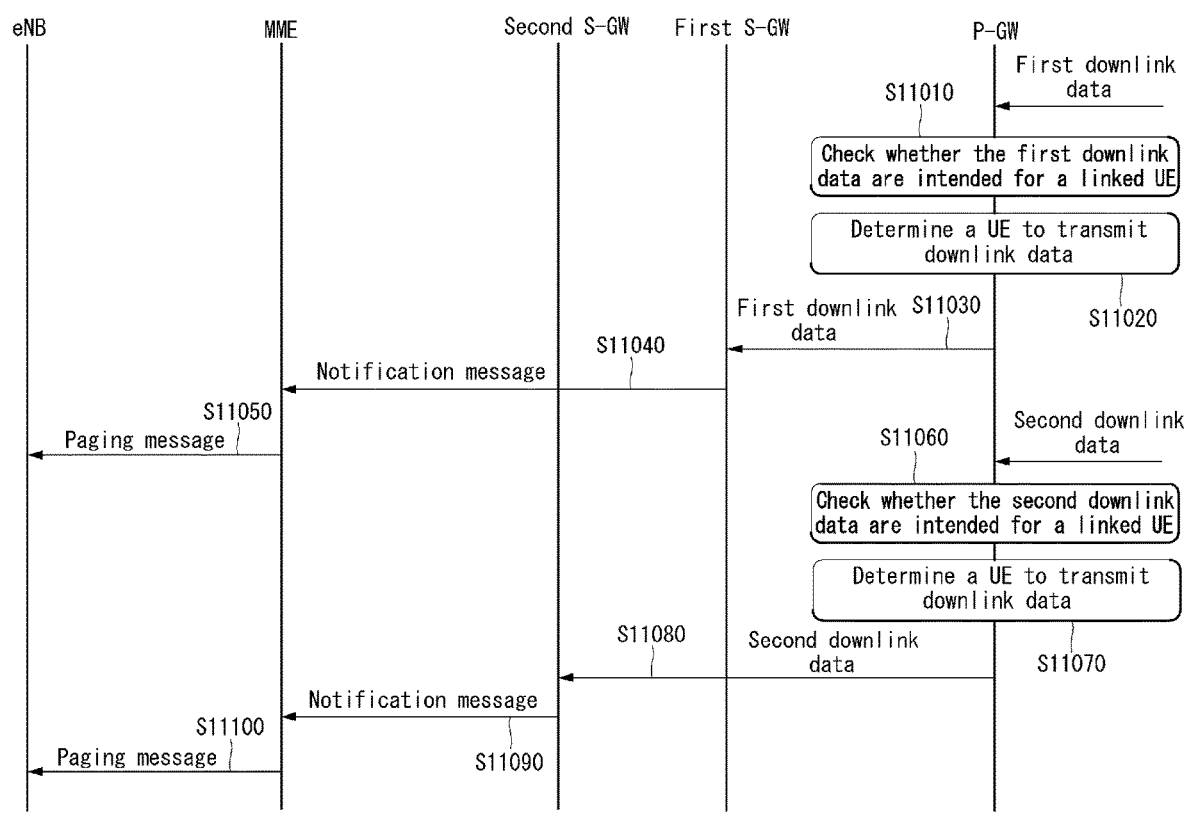

[FIG. 12]
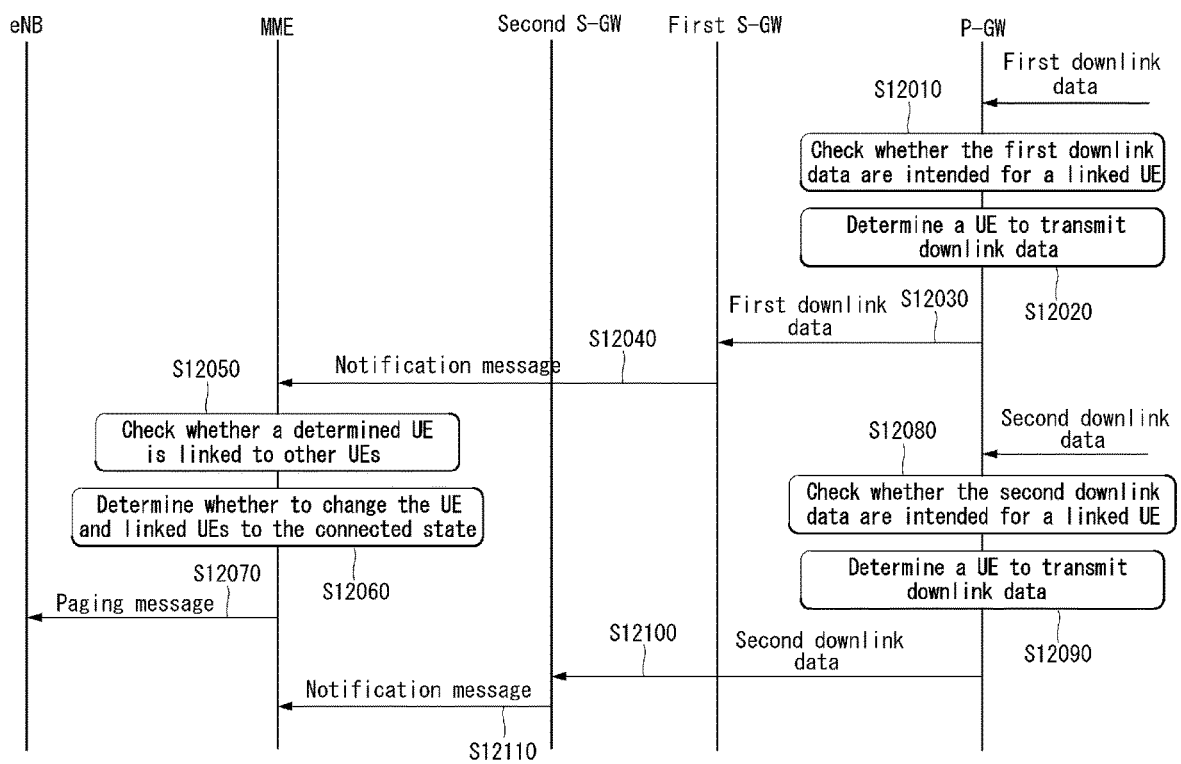

[FIG. 13]
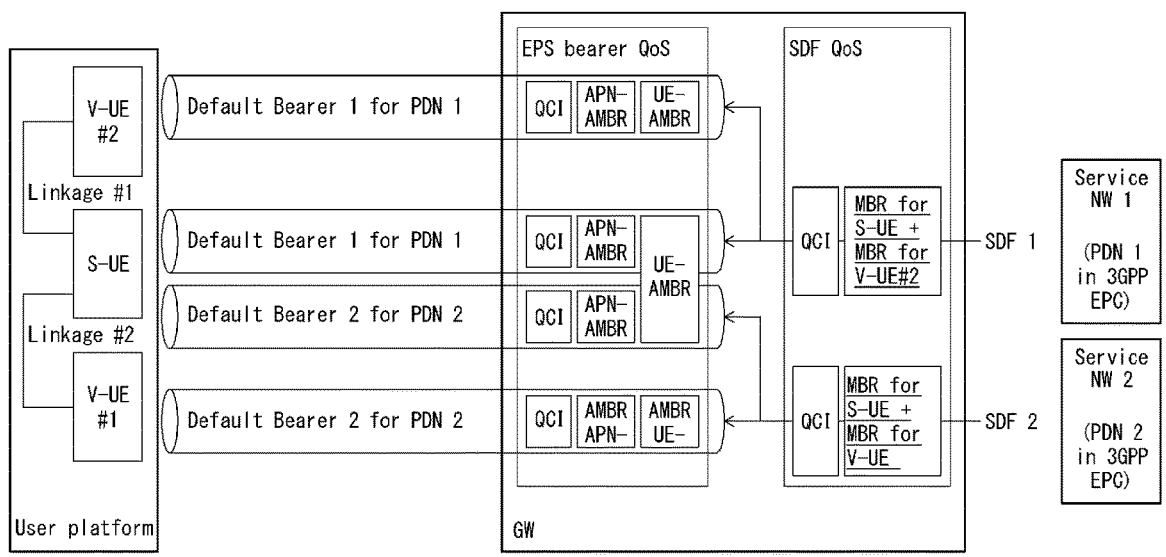

[FIG. 14]
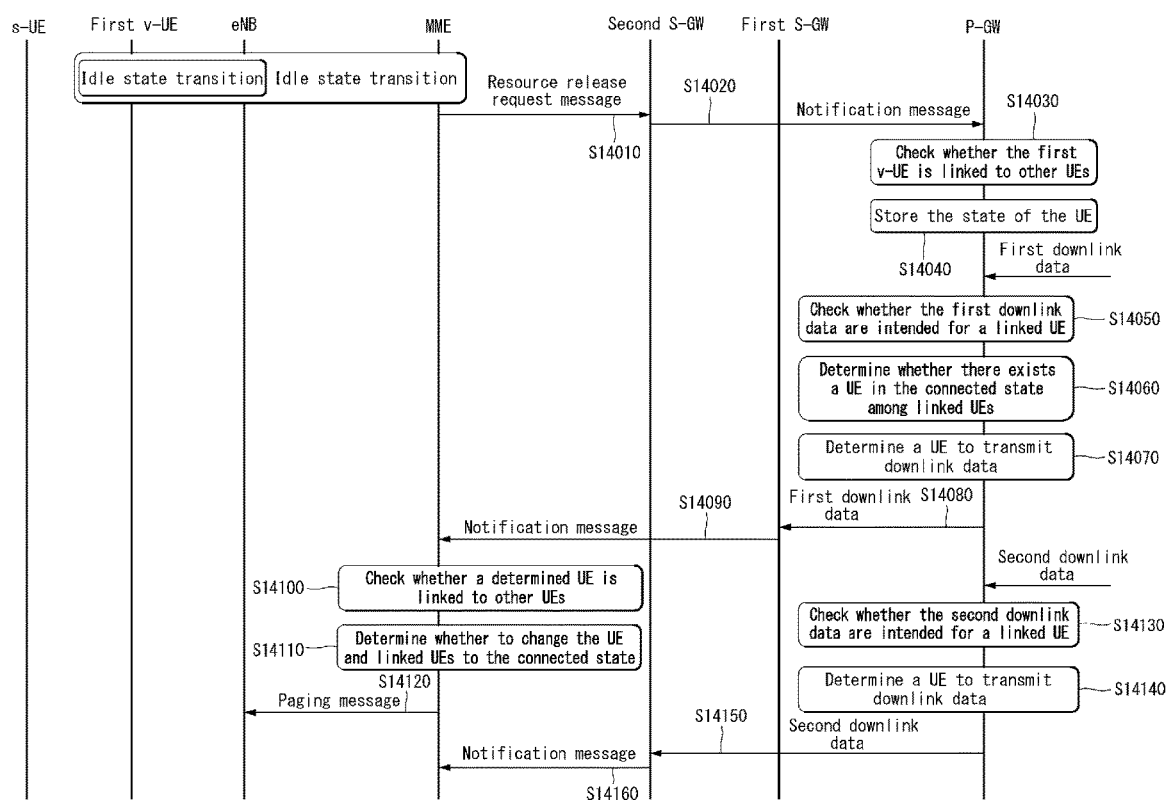

[FIG. 15]
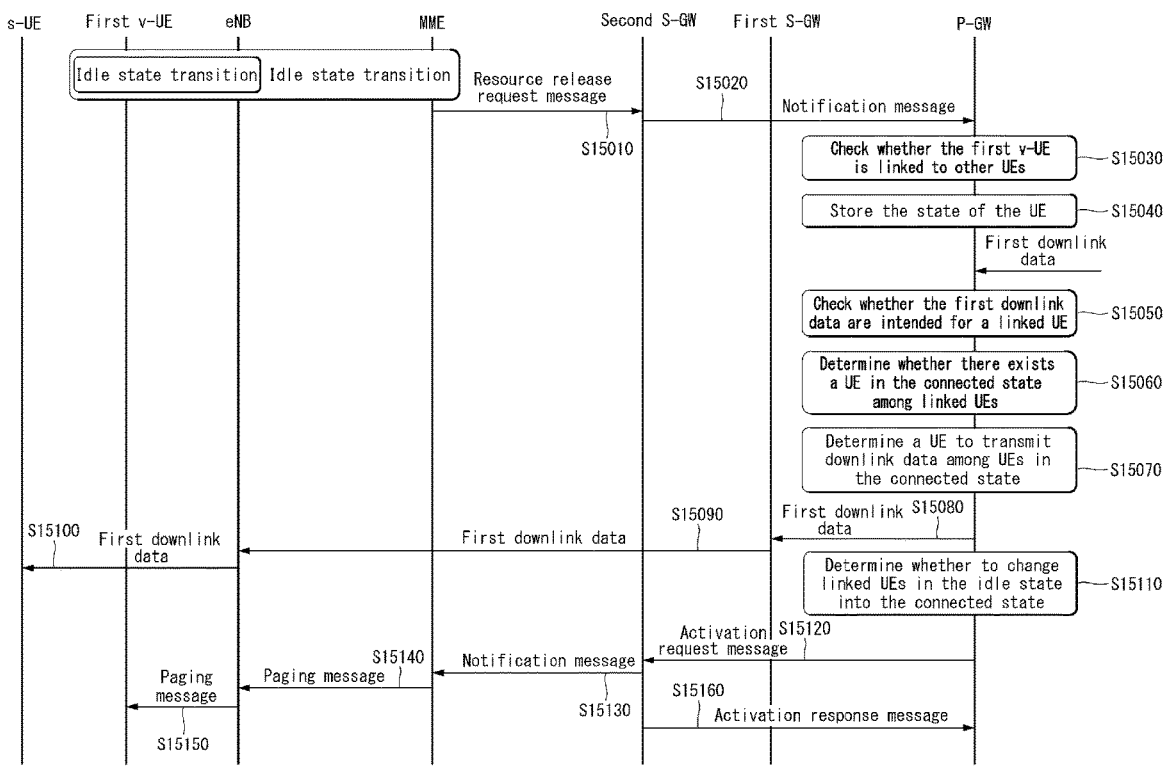

[FIG. 16]
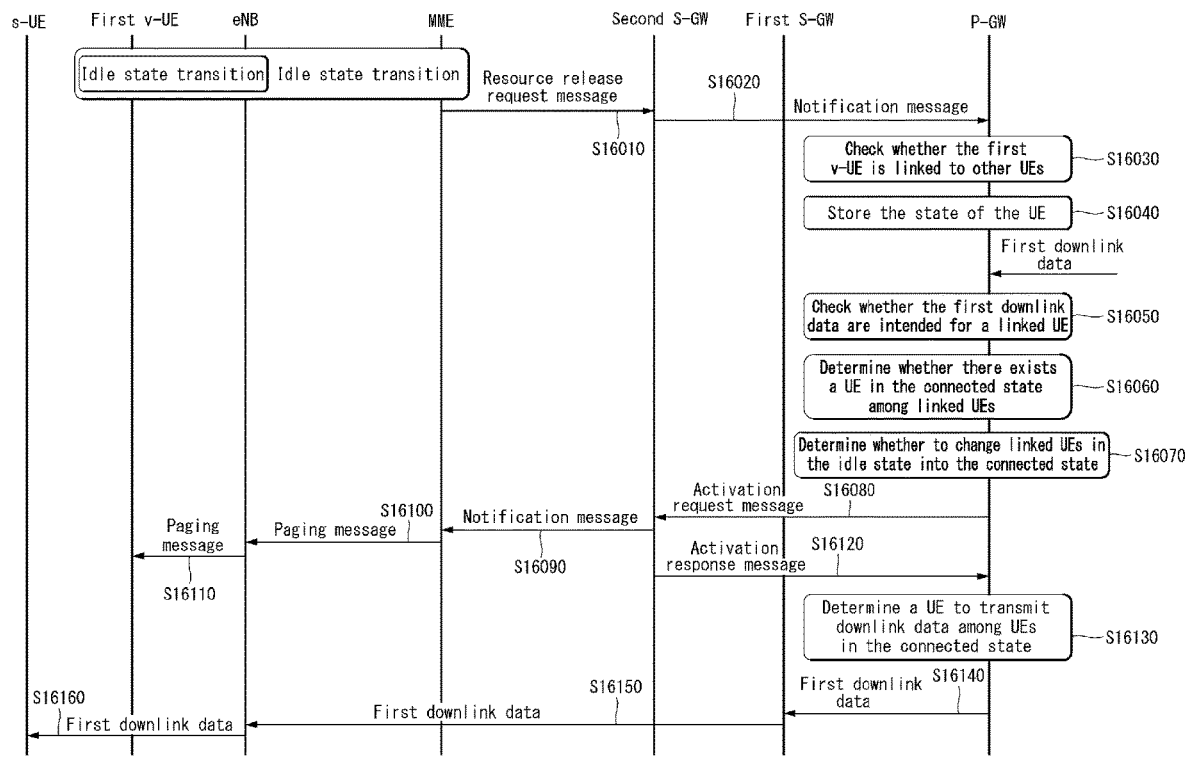

[FIG. 17]
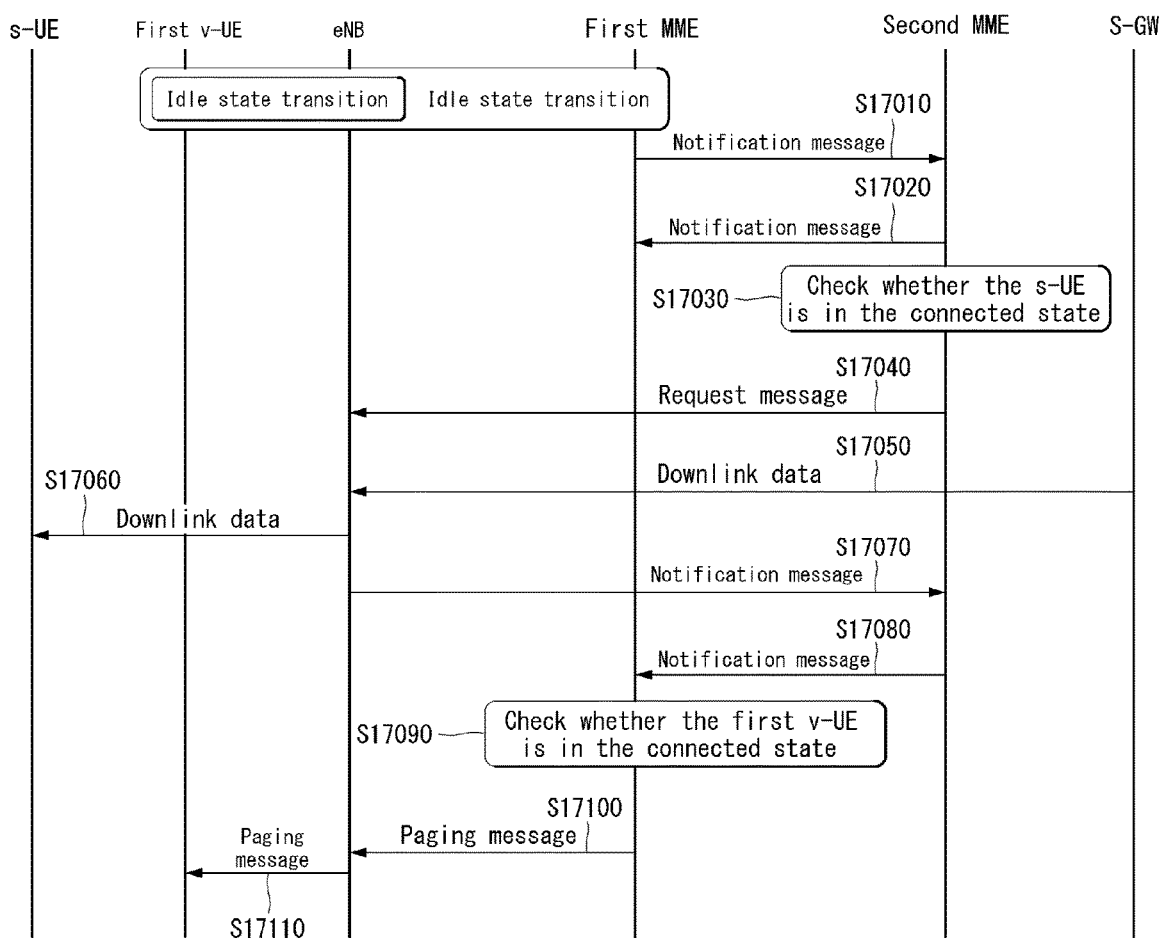

[FIG. 18]
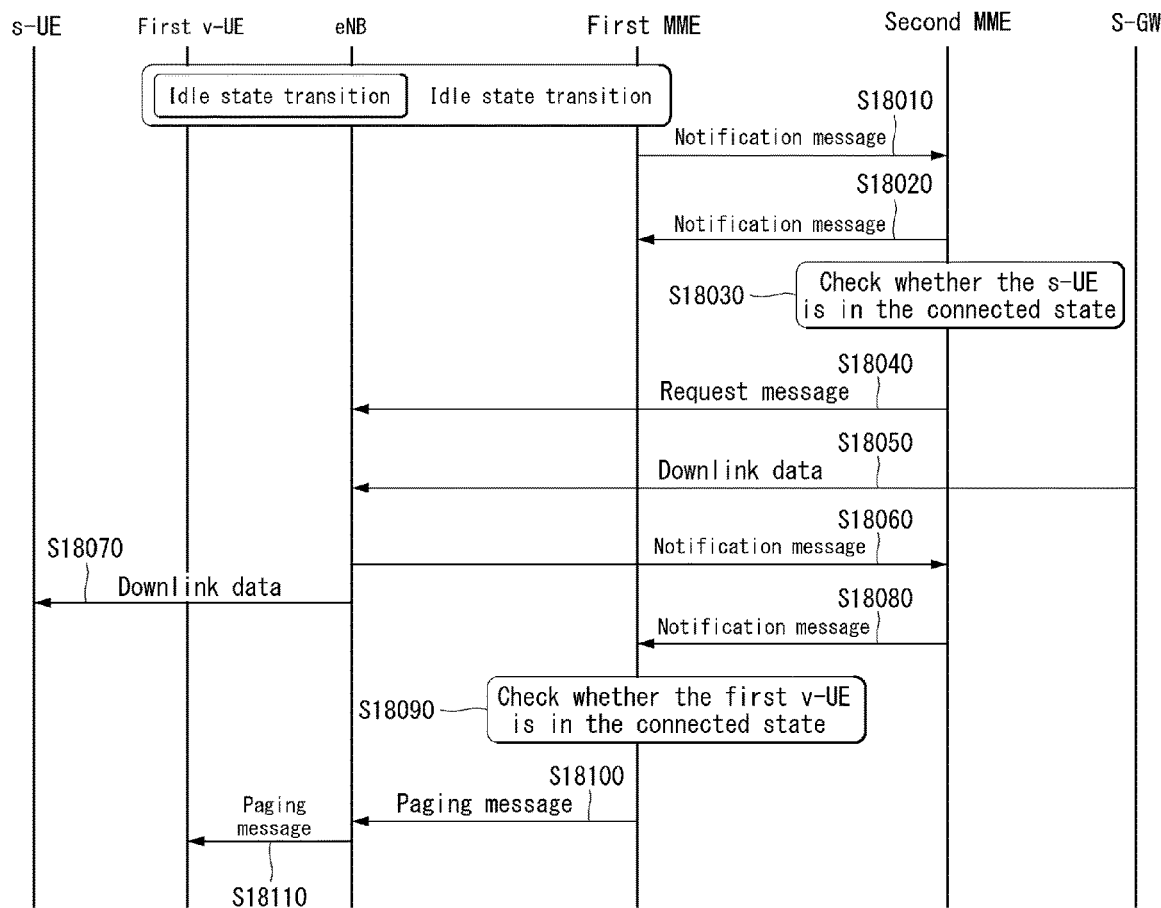

[FIG. 19]
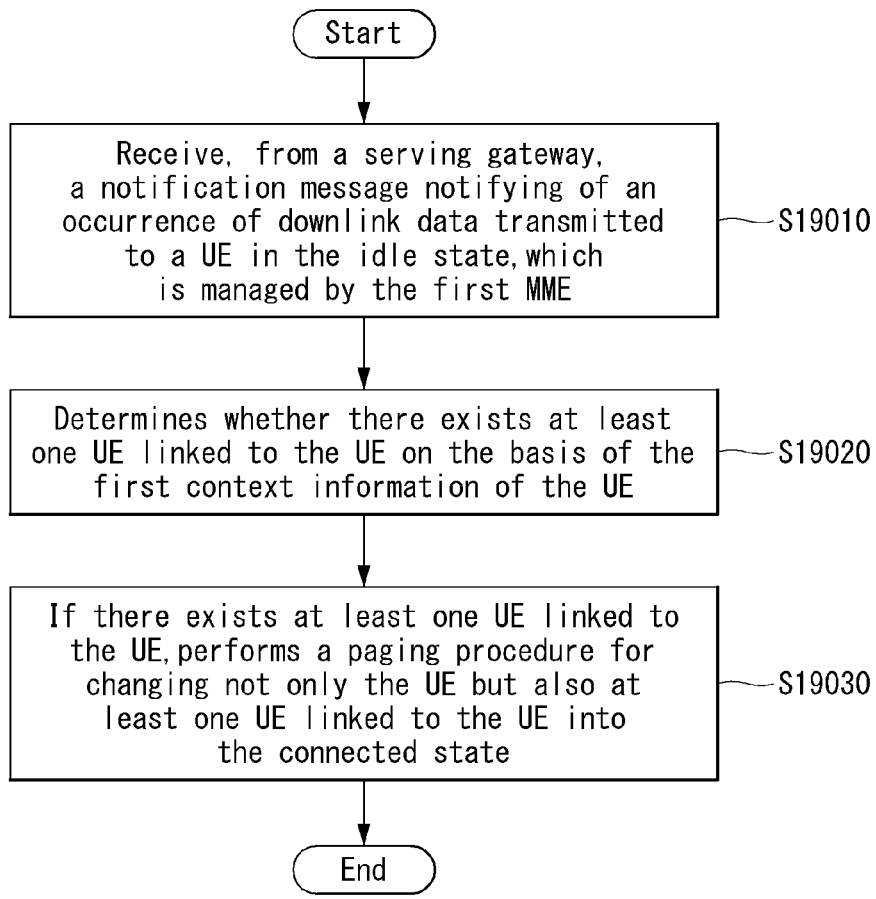
[FIG. 20]
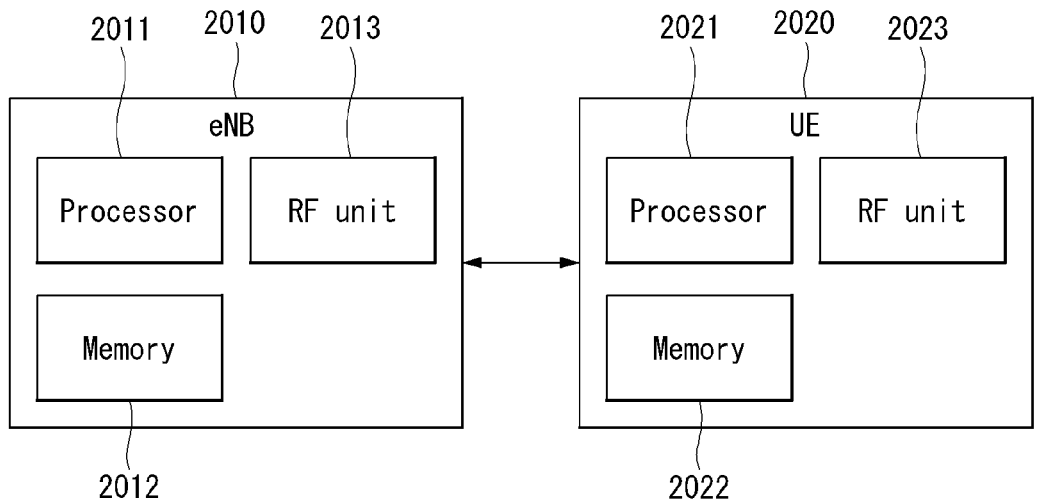

METHOD AND APPARATUS FOR TRANSMITTING AND RECEIVING DATA BY TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2017/001484, filed on Feb. 10, 2017, which claims the benefit of U.S. Provisional Application No. 62/293,774, filed on Feb. 11, 2016, 62/305,541, filed on Mar. 9, 2016, 62/348,955, filed on Jun. 12, 2016, 62/351,278, filed on Jun. 16, 2016, and 62/353,035, filed on Jun. 22, 2016, the contents of which are all hereby incorporated by reference herein in their entirety.

TECHNICAL FIELD

The present invention relates to a method for transmitting and receiving data of a terminal in a wireless communication system. More specifically, the present invention relates to a method and a device for transmitting and receiving data after a terminal enters a connected state through a paging procedure when the terminal is in an idle state.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and a device for transmitting and receiving data by changing a terminal into a connected state through a paging procedure when the terminal is in an idle state.

Also, when downlink data to be transmitted to a terminal in the idle state is generated, an object of the present invention is to provide a method and a device for changing the state of even a different terminal linked to the terminal into the connected state through the paging procedure for changing the terminal in the idle state into the connected state.

Also, an object of the present invention is to provide a method and a device for transmitting and receiving data through a plurality of terminals by changing a terminal and different terminals linked to the terminal to which the same IP address has been allocated through one paging procedure into the connected state.

Also, when part of a plurality of linked terminals to which the same IP address has been allocated exists in the connected state while another part thereof exists in the idle state, an object of the present invention is to provide a method and a device for transmitting and receiving data by transmitting data through terminals in the connected state and changing the terminals in the idle state into the connected state simultaneously.

Technical objects of the present invention are not limited to the above-described object and other technical objects that have not been described above will become evident to those skilled in the art from the following description.

Technical Solution

To solve the technical problem above, the present invention provides a method and a device for updating position of a terminal.

More specifically, a method for activating a terminal according to one embodiment of the present invention comprises receiving a notification message notifying of an occurrence of first downlink data transmitted to a user equipment (UE) managed by a first mobility management entity from a serving gateway (S-GW); determining if there is at least one terminal linked to the UE based on first context information of the UE; and if there is at least one UE linked to the UE, performing a paging procedure for changing the UE and the at least one UE into a connected state.

Also, according to the present invention, a same IP address is allocated to the UE and the at least one UE.

Also, according to the present invention, the first mobility management entity stores the first context information and second context information of the at least one UE.

Also, according to the present invention, a session for a same packet data network (PDN) is configured for the UE and the at least one UE.

Also, the performing a paging procedure according to the present invention includes transmitting, to an eNB, a paging message for changing the UE and the at least one UE into a connected state.

Also, the performing a paging procedure according to the present invention includes transmitting, to an eNB, a paging message for changing the UE into a connected state; and transmitting, to a second mobility management entity managing the at least one UE, a request message requesting transition of the at least one UE into a connected state.

Also, the present invention further comprises transmitting, to the serving gateway, a request message requesting release of a resource allocated to the UE, wherein the request message includes state information indicating the state of the UE.

Also, the present invention further comprises, when the UE enters an idle state, transmitting first state information indicating the state of the UE to a second mobility management entity managing the at least one UE; and receiving second state information indicating the state of the at least one UE from the second mobility management entity.

Also, the present invention further comprises, when second downlink data transmitted to a specific UE among the at least one UE is occurred, receiving an indication message indicating the occurrence of the second downlink data from the second mobility management entity; and transmitting, to an eNB, a paging message for changing the UE into a connected state.

Also, the present invention comprises a communication unit transmitting and receiving a radio signal to and from the outside; and a processor functionally linked to the communication unit, wherein the processor is configured to receive a notification message notifying of an occurrence of first downlink data transmitted to a user equipment (UE) managed by the first mobility management entity from a serving gateway (S-GW), to determine if there is at least one terminal linked to the UE on the basis of context information of the UE; and if there is at least one UE linked to the UE, to perform a paging procedure for changing the UE and the at least one UE into a connected state.

Advantageous Effects

If a terminal is in the idle state, the present invention may transmit and receive data by changing the terminal into the connected state through a paging procedure.

Also, when downlink data to be transmitted to a terminal in the idle state is generated, the present invention may change the terminal and other terminals linked to the terminal into the connected state through the paging procedure for changing the terminal in the idle state into the connected state.

Also, the present invention changes a terminal and other terminals linked to the terminal to which the same IP address has been allocated into the connected state through one paging procedure, thereby transmitting and receiving a plurality of data efficiently.

Also, when part of a plurality of linked terminals to which the same IP address has been allocated exists in the connected state while another part thereof exists in the idle state, the present invention transmits data through terminals in the connected state and changes the terminals in the idle state into the connected state simultaneously, thereby transmitting and receiving data efficiently.

The technical effects of the present invention are not limited to the technical effects described above, and other technical effects not mentioned herein may be understood to those skilled in the art to which the present invention belongs from the description below.

BRIEF DESCRIPTION OF THE DRAWINGS

FIG. 1 shows one example of Evolved Packet System (EPS) related to a LTE system to which the present invention may be applied.

FIG. 2 is a block diagram of functional splitting between E-UTRAN and EPC to which the present invention may be applied.

FIG. 3 is a block diagram of one example of a radio protocol architecture to which technical features of the invention may be applied.

FIG. 4 illustrates EMM and ECM states in a wireless communication system to which the present invention may be applied.

FIG. 5 illustrates a bearer structure in a wireless communication system to which the present invention may be applied.

FIG. 6 illustrates a transmission path of a control plane and user plane in an EMM registered state in a wireless communication system to which the present invention may be applied.

FIG. 7 shows one example of parameter configuration for QoS (Quality of Service) management.

FIG. 8 is a block diagram of one example of a radio protocol architecture of a user platform to which the present invention may be applied.

FIG. 9 shows one example of a data transmission/reception method between a user platform and a base station to which the present invention may be applied.

FIG. 10 shows one example of parameter configuration for Quality of Service (QoS) management to which the present invention may be applied.

FIG. 11 is a flow diagram illustrating one example of a method for paging a plurality of linked terminals to which the present invention is applied.

FIG. 12 illustrates one example according to the present invention, in which terminals linked to each other and included in a user platform constitute service networks different from each other.

FIG. 13 is a flow diagram illustrating one example, in which, when a plurality of linked terminals is in the idle state, a method according to the present invention pages the terminals in the idle state.

FIG. 14 is a flow diagram illustrating one example, in which, when part of a plurality of linked terminals are in the idle state, a method according to the present invention pages the terminals in the idle state.

FIG. 15 is a flow diagram illustrating another example, in which, when part of a plurality of linked terminals are in the idle state, a method according to the present invention pages the terminals in the idle state.

FIG. 16 is a flow diagram illustrating a yet another example, in which, when part of a plurality of linked terminals are in the idle state, a method according to the present invention pages the terminals in the idle state.

FIG. 17 is a flow diagram illustrating a still another example, in which, when part of a plurality of linked terminals are in the idle state, a method according to the present invention pages the terminals in the idle state.

FIG. 18 is a flow diagram illustrating a further example, in which, when part of a plurality of linked terminals are in the idle state, a method according to the present invention pages the terminals in the idle state.

FIG. 19 is a flow diagram illustrating one example of a method for an MME to which the present invention is applied to change a UE in the idle state into the connected state through a paging procedure.

FIG. 20 is one example of an internal block diagram of a wireless device to which the present invention may be applied.

BEST MODE

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

FIG. 2 illustrates a functional split of an E-UTRAN and an EPC to which the present invention can be applied.

Referring to FIG. 2, a deviate crease line block indicates radio protocol layer, and an empty block indicates the functional entity of a control plane.

A base station performs the following function. (1) radio resource management (RRM) functions, such as radio bearer control, radio admission control, connection mobility control, and dynamic resource allocation to a user equipment, (2) Internet protocol (IP) header compression and the encryption of a user data stream, (3) the routing of user plane data toward an S-GW, (4) the scheduling and transmission of a paging message, (5) the scheduling and transmission of broadcast information, and (6) measurement for mobility and scheduling and a measurement report configuration.

The MME performs the following functions. (1) the distribution of a paging message to base stations, (2) security control, (3) idle state mobility control, (4) SAE bearer control, and (5) the ciphering and integrity protection of non-access stratum (NAS) signaling.

The S-GW performs the following functions. (1) the termination of a user plane packet for paging and (2) user plane switching for the support of user equipment mobility.

FIG. 3 is a block diagram showing an example of radio protocol architecture to which the technical characteristics of the present invention may be applied.

FIG. 3(a) shows an example of radio protocol architecture for a user plane, and FIG. 3(b) is a block diagram showing an example of radio protocol architecture for a control plane.

The user plane is a protocol stack for user data transmission, and the control plane is a protocol stack for control signal transmission.

Referring to FIGS. 3(a) and 3(b), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "I" includes both the concepts of "or" and "and") to a transport block provided to a physical channel on the transport channel of an MAC service data unit (SDU) that belongs to a logical channel. The MAC layer provides service to a radio link control (RLC) layer through the logical channel.

The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a user equipment and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a user equipment and the RRC layer of an E-UTRAN, the user equipment is in the RRC connected state. If not, the user equipment is in the RRC idle state.

A downlink transport channel through which a network transmits data to a user equipment includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a user equipment transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel. A transmission time interval (TTI) is a unit time of subframe transmission.

FIG. 4 is a diagram illustrating EMM and an ECM state in a wireless communication system to which the present invention may be applied.

Referring to FIG. 4, in order to manage the mobility of a user equipment in the NAS layer located in the control plane of the user equipment and the MME, an EMM registration state (EMM-REGISTERED) and an EMM deregistration state (EMM-DEREGISTERED) may be defined depending on whether the user equipment has been attached to or detached from a network. The EMM-REGISTERED state and the EMM-DEREGISTERED state may be applied to the user equipment and the MME.

At the initial stage, such as a case where a user equipment is first powered on, the user equipment is in the EMM-DEREGISTERED state. In order to access the network, the user equipment performs a process of registering with the corresponding network through an initial attach procedure. When the connection procedure is successfully performed, the user equipment and the MME make transition to the EMM-REGISTERED state. Furthermore, if the user equipment is powered off or a radio link fails (if a packet error rate exceeds a reference value on the radio link), the user equipment is detached from the network and makes transition to the EMM-DEREGISTERED state.

Furthermore, in order to manage a signaling connection between the user equipment and the network, an ECM connected state (ECM-CONNECTED) and an ECM idle state (ECM-IDLE) may be defined. The ECM-CONNECTED state and the ECM-IDLE state may also be applied to the user equipment and the MME.

An RRC state indicates whether the RRC layer of a user equipment and the RRC layer of a base station have been logically connected. That is, if the RRC layer of the user equipment and the RRC layer of the base station are connected, the user equipment is in the RRC connected state (RRC_CONNECTED). If the RRC layer of the user equipment and the RRC layer of the base station are not connected, the user equipment is in the RRC idle state (RRC_IDLE).

Case when ECM State is Associated with RRC State

The ECM connection includes an RRC connection established between the user equipment and the base station and an S1 signaling connection established between the base station and the MME. In other words, enabling/disabling the ECM connection means that both RRC connection and S1 signaling connection are enabled/disabled.

The network may determine the presence of user equipment in the ECM-CONNECTED & RRC-CONNECTED state on a cell-by-cell basis and may effectively control the user equipment.

In contrast, the network cannot check the presence of the user equipment in the ECM-IDLE state, and a core network (CN) manages the user equipment in a tracking area unit, that is, an area unit larger than a cell. When the user equipment is in the ECM idle state, the user equipment performs discontinuous reception (DRX) configured by NAS using an ID uniquely allocated in a tracking area. That is, the user equipment may receive the broadcasting of system information and paging information by monitoring a paging signal at a specific paging occasion every user equipment-specific paging DRX cycle.

Furthermore, when the user equipment is in the ECM-IDLE state, the network does not have context information of the user equipment. Accordingly, the user equipment in the ECM-IDLE state may perform a user equipment-based mobility-related procedure, such as cell selection or cell reselection, without a need to receive a command from the network. If the location of the user equipment in the ECM idle state is different from that known to the network, the user equipment may notify the network of the location of the corresponding user equipment through a tracking area update (TAU) procedure.

In contrast, when the user equipment is in the ECM-CONNECTED & RRC-CONNECTED state, the mobility of the user equipment is managed by a command from the network. In the ECM-CONNECTED state, the network is aware of a cell to which the user equipment belongs. Accordingly, the network may transmit and/or receive data to the user equipment or from the user equipment, may control mobility, such as handover of the user equipment, and may perform cell measurement for a neighboring cell.

As described above, in order for a user equipment to receive a common mobile communication service such as voice or data, the user equipment must shift to the ECM-CONNECTED & RRC-CONNECTED state. At the initial stage, such as a case where the user equipment is first powered on, the user equipment is in the ECM-IDLE state like the EMM state. When the user equipment is successfully registered with a corresponding network through an initial attach procedure, the user equipment and an MME make transition to the ECM connected state. Furthermore, if the user equipment has been registered with the network, but a radio resource has not been allocated because traffic has been deactivated, the user equipment is in the ECM-IDLE state. When uplink or downlink new traffic is generated in the corresponding user equipment, the user equipment and the MME make transition to the ECM-CONNECTED state through a service request procedure.

Case when ECM State is not Associated with RRC State

The ECM connection includes the RRC connection established between the user equipment and the base station and the S1 signaling connection established between the base station and the MME, but may be independent of the RRC state. That is, the ECM state between the user equipment and the MME may maintain the connected state even when the RRC state transitions from the connected state to the idle state.

Operations of the network/base station and user equipment in ECM-CONNECTED & RRC-CONNECTED state and ECM-IDLE state may be the same as operations in case when ECM state is associated with RRC state.

The network in the ECM-CONNECTED & RRC-IDLE state may perform the same operation as the operation in the ECM-CONNECTED state, but may manage the mobility of the user equipment in a specific unit including the base station and user equipment and may re-establish a connection (for example, S1 signaling connection, S1 data connection) path with MME/S-GW.

Therefore, the user equipment may perform different operations according to its state as follows.

ECM-IDLE: message transmission for ECM and RRC connection state transition

ECM-CONNECTED & RRC-IDLE (excluding RRC-IDLE of the user equipment due to radio link failure): message transmission for resuming RRC connection state transition and connection recommence ECM-CONNECTED & RRC-IDLE (RRC-IDLE of the user equipment due to radio link failure): message transmission for RRC connection re-establishment.

FIG. 5 is a diagram illustrating a bearer structure in a wireless communication system to which the present invention may be applied.

When a UE is connected to a Packet Date Network (PDN), a PDN connection is generated, and the PDN connection may also be called an EPS session. A PDN is an internet protocol network which is exterior or interior of a service provider, and provides a service function such as an internet or IP Multimedia Subsystem (IMS).

The EPS session has one or more EPS bearer. The EPS bearer is the transmission path of traffic generated between a user equipment and a PDN GW in order for the EPS to transfer user traffic. One or more EPS bearers may be configured per user equipment.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a user equipment and an EPC. If the E-RAB is present, the E-RAB bearer and the EPS bearer are mapped in a one-to-one manner. A data radio bearer (DRB) transfers the packet of the EPS bearer between the user equipment and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The user equipment binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The user equipment stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A user equipment may have one default bearer or one or more dedicated bearers per PDN. The least default bearer having an EPS session with respect to one PDN is called a default bearer.

The EPS bearer may be classified based on an identity. The EPS bearer identity is allocated by a user equipment or an MME. The dedicated bearer(s) is combined with a default bearer by a linked EPS bearer identity (LBI).

When a user equipment is initially attached to a network through an initial attach procedure, it receives an IP address allocated thereto and thus a PDN connection is generated. A default bearer is generated at the EPS interval. The default bearer is maintained without being released unless the PDN connection with the user equipment is terminated although there is no traffic between the user equipment and a corresponding PDN. When the corresponding PDN connection is terminated, the default bearer is also released. In this case, all of bearers in the interval forming a default bearer with the user equipment are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a user equipment uses a service (e.g., Internet) through a default bearer, if the user equipment uses a service (e.g., video on demand (VoD)) insufficient to receive quality of service (QoS) using only the default bearer, a dedicated bearer when the user equipment demands the dedicated bearer. If there is no traffic of the user equipment, the dedicated bearer is released. A user equipment or a network may generate a plurality of dedicated bearers, if necessary.

An IP flow may have a different QoS characteristic depending on that a user equipment uses which service. When a network establishes/modifies an EPS session for the user equipment, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a user equipment. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a user equipment via the EPS, it is mapped to an EPS bearer capable of providing proper QoS according to a QoS rule stored in the P-GW.

The PCC rule is divided into a dynamic PCC rule and a pre-defined PCC rule. The dynamic PCC rule is dynamically provided from the PCRF to the P-GW when the EPS session is established/modified. In contrast, the pre-defined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a user equipment uses a service through a default bearer, if the user equipment uses a service incapable of receiving QoS using only the default bearer, a dedicated bearer is generated in response (on-demand) to a request from the user equipment.

FIG. 6 is a diagram illustrating the transmission path of a control plane and a user plane in an EMM registration state in a wireless communication system to which the present invention may be applied.

FIG. 6(a) illustrates an ECM-CONNECTED state, and FIG. 16(b) illustrates ECM-IDLE.

When a user equipment becomes the EMM-Registered state by successfully attaching to a network, it is provided with a service using an EPS bearer. As described above, the EPS bearer is divided into a DRB, an S1 bearer, and an S5 bearer for each interval.

As in FIG. 6(a), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 6(b), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

FIG. 7 shows one example of parameter configuration for QoS (Quality of Service) management.

Referring to FIG. 7, the wireless communication system applies QoS policy on the SDF (Service Data Flow) basis and on the EPS bearer basis. The SDF (Service Data Flow) includes one or more IP flows as classified based on the service type. The EPS bearer acts as a logical path along which one or more SDFs are transmitted. That is, the QoS of the data to be transmitted/received may be managed by the following QoS parameters.

Resource type: bandwidth guaranteed type and non-guaranteed type

Guaranteed bit rate (GBR): Guaranteed minimum bandwidth

Maximum bit rate (MBR): Maximum bandwidth as allowed

Access point name-Aggregate Maximum Bit Rate (APN-AMBR): Maximum bandwidth allowed per APN UE-AMBR: maximum bandwidth allowed per user equipment When a packet inflows in a manner exceeding the bandwidth specified in the MBR, APN-AMBR, and UE-AMBR QoS parameters, each entity mentioned below discards overflowed packets.

Rate Policing for Downlink Data

First: the P-GW discards a quantity of the incoming packets in excess of the MBR for each SDF.

Second: the P-GW discards a quantity of packets in excess of the MBR for one or more SDFs which have been introduced into each GBR EPS bearer and discards a quantity of packets exceeding the APN-AMBR for one or more SDFs which have been introduced into all non-GBR EPS bearers.

Third: the base station discards a quantity of packets exceeding the UE-AMBR for one or more SDFs that have been introduced into all No-GBR EPS bearers.

Rate Policing for Uplink Data

First: the user equipment discards a quantity of packets in excess of MBR (GBR) and APN-AMBR (Non-GBR).

Second: The base station discards a quantity of packets in excess of MBR (GBR) and UE-AMBR (Non-GBR).

Third: the P-GW discards a quantity of packets in excess of the APN-AMBR for one or more SDFs which have been introduced in all Non-GBR EPS bearers and discards a quantity of packets in excess of the MBR for each SDF.

The QoS parameters as described above may be applied to each of the user equipments. In this way, the amount of packets in excess of the QoS parameters that may be applied to each user equipment are discarded. Further, there is a limit in improvement of the data transmission rate of each user equipment using QoS parameters of each user equipment.

Thus, to solve the problem in accordance with the present invention, a data boosting control method is provided in which a service is received from the same gateway using a number of communication devices included in one wireless device.

The data boosting method described herein may be interpreted as a method of increasing the data transmission rate by receiving a service using one or more communication devices included in one wireless device.

The communication devices included in the wireless device share a specific layer of the wireless device, as described below.

FIG. 8 is a block diagram of one example of a radio protocol architecture for a wireless device to which the present invention may be applied.

A wireless device as described herein may also refer to a user platform that includes one or more communication devices.

The communication device may also refer to a communication modem itself, which may be implemented to communicate with externals. Alternatively, the communication device may refer to a device including the communication modem.

That is, the wireless device may refer to a device that includes communication devices with the same or different Radio Access Technologies (RATs).

Thus, the communication device may be exchanged with a wireless user equipment, a communication modem, or the like.

Further, the wireless device may refer to a UE defined in 3GPP. However, it may be desirable for the wireless device to be interpreted beyond the UE defined in 3GPP. That is, the wireless device may be a vehicle, and so on in one example.

Further, the communication device may include a first communication device and one or more second communication devices.

The first communication device may refer to a communication device in the same user platform that first accesses the network. The first communication device may be referred to as a master user equipment, a special user equipment, a primary user equipment, or a first user equipment.

Hereinafter, the first communication device will be abbreviated as a S (special)-UE.

Further, the second communication device refers to a communication device that subsequently (or after the access of the first communication device) accesses the network. The second communication device may be referred to as slave user equipment, virtual user equipment, secondary user equipment, second user equipment, or the like.

Hereinafter, the second communication device will be abbreviated as a V (Virtual)-UE.

That is, the second communication device means a communication device that additionally accesses the network when the S-UE is already present in the same user platform.

Further, the communication devices within the user platform may share an application layer, a transmission layer and a network layer, as shown in FIG. 8(a).

At this time, when the user platform transmits uplink data to the base station using multiple communication devices, adaptation in the network layer plays a role in determining which communication device transmits the uplink data. That is, the adaptation determines a routing path for the uplink data.

Further, each communication device may individually include an NAS layer, an RRC layer, a MAC layer, an RLC layer, a PDCP layer and a PHY layer, as shown in FIG. 8(b).

The layers that constitute the user platform may be physically located at the same location or in a distributed manner.

At this time, when the S-UE transitions to the idle state, one V-UE among the V-UEs may act as an S-UE.

When, as described above, a plurality of communication devices are included in one user platform, each communication device may individually access the network to transmit/receive data.

Here, the majority of communication devices may use the same RAT or different RATs.

However, since the communication devices in the user platform are allocated different IP addresses, the communication devices may not receive the same service from the same gateway.

Thus, even when the user platform includes the multiple communication devices, the user platform may not exceed a maximum data transmission rate based on the QoS parameter of each communication device.

Therefore, in the following, there is disclosed a method for allocating the same IP address to the communication devices in the same user platform, thereby to increase the data transmission rate using the plurality of communication devices. That is, a data boosting method will be described.

FIG. 9 shows one example of a data transmission/reception method between a user platform and a base station to which the present invention may be applied.

In FIG. 9, it may be assumed that the S-UE and V-UE are allocated the same IP address.

A service server transmits data related to a service provided by the service server to a gateway of a cellular network over the Internet network.

The cellular network may include the base station, and the gateway.

The gateway may include at least one of the S-GW or P-GW.

The gateway transmits to the base station the downlink data to be transmitted to the communication device in the user platform. Then, the base station transmits the received downlink data to at least one communication device of the user platform.

At this time, since the S-UE and the V-UE have the same IP address, the user platform may receive the downlink data from the gateway using the two UEs (S-UE, V-UE) included in the user platform rather than using only one UE.

The downlink data as transmitted from the gateway is transmitted to the user platform through the base station.

Here, the base station does not know that the S-UE and V-UE constitute the single user platform. Therefore, the base station plays only a role in transferring the downlink data as transmitted from the gateway to the S-UE and V-UE.

That is, when the gateway allocates the same IP address to the S-UE and the V-UE and transmits the data to the user platform using the allocated IP address as a destination address. Thus, the V-UE as well as the S-UE may receive the data. This may improve the data transmission rate.

At this time, the S-UE and V-UE may act as user equipments linked to each other.

Here, the linked user equipments may refer to user equipments that are included in the same user platform and share the upper layer (application layer, transmission layer, network layer) of the user platform.

The communication devices (e.g., S-UE, V-UE) constituting the user platform communicate with the network entity (e.g., base station, MME, etc.) in the network using the same communication protocol.

The network entity or network node processes each of the communication devices (S-UE, V-UE) constituting the user platform independently or individually using the same protocol.

Further, since each of the communication device constituting the same user platform must communicate with the cellular network, each communication device must be individually subscribed to the cellular network. That is, the user platform must be subscribed to the network times corresponding to the total number of communication devices that constitute the user platform.

In this way, the methods proposed herein may use a number of the mutually-linked communication devices included in the same user platform to receive the same service, thereby improving the data transmission rate.

FIG. 10 shows one example of parameter configuration for Quality of Service (QoS) management.

In order to improve the data transmission rate associated with the service from the specific user platform by allocating the same IP address to the plurality of the mutually-linked communication devices within the specific user platform, separate rate policing should be applied as shown in FIG. 11.

As shown in FIG. 10, SDF 1 is transmitted to V-UE and S-UE via two Default Bearers, while SDF 2 is transmitted to V-UE and S-UE via two dedicated bearers.

That is, multiple paths to different communication devices may be present for one SDF. Considering this, the following rate policing should be applied.

The rate policing to be considered for the data boosting proposed in this specification will be described.

First, the operations of the gateway may be divided into an operation related to the SDF and an operation related to the logical paths (for example, EPS Bearer, etc.) for data transmission/reception.

The gateway operates with a maximum bit rate (MBR) considering the multiple paths mapped to each SDF.

For example, the MBR may refer to the sum of the MAX Bit Rates of all user equipments, each of which maps to one SDF to constitute the multi-paths.

Further, the gateway distributes the downlink data so that the distribution rate does not exceed the QoS parameters (for example, MBR, APN-AMBR, and UE-AMBR) of each user equipment constituting the multi-paths.

Next, the user platform sublayer operation (adaptation) may be associated with the data logical path.

That is, the sublayer of the user platform operates to distribute the uplink data so that the distribution rate does not exceed the MBR and APN-AMBR of each of the user equipment constituting the multiple paths.

As described above, in the method proposed in the present specification, the separate rate policing may be applied to a plurality of communication devices allocated with the same IP address. As a result, the data transmission rate of the service provided to the user platform may be improved as compared with the case of receiving data using one communication device.

Further, allocating the same IP address to the mutually-linked user equipments and transmitting/receiving the data using the same IP address may allow the data transmission rate to be improved. As a result, this may meet the requirements for service (for example, data throughput, etc.) as required by next-generation mobile communication standards without changing the network in the legacy LTE technology.

That is, according to the present invention, a number of user equipments constituting the user platform may be mutually linked. Further, the same IP address may be allocated to the user equipments to improve data throughput without changing an interface between the user equipment based on the LTE technology and the base station, and an interface between the user equipment and the MME.

Further, the same IP address may be allocated by a procedure for establishing a session between MMEs that manage a plurality of mutually-linked user equipments. This may establish the session for each data transmission/reception using the same IP address.

That is, when the MME receives a message requesting the session establishment from the user equipment, the MME informs the MMEs managing further user equipments linked with the user equipment that that the request message has been receive. Thus, in the session establishment procedure, the same IP address may be allocated to the mutually linked user equipments.

There is no interface change between base station and user equipment in order to allocate the same IP address while establishing each session. Thus, the base station does not know that user equipments has the same IP address and are linked with each other. Rather, the core stage may store and manage information about the subscriber, and information about the user equipment of a HSS.

Using this method, the user equipments have the same IP address, and, thus, data to provide the same service may be received via the multiple user equipment. Since the multiple user equipments receive the data to provide the same service, data throughput may be improved.

Further, this approach may simultaneously and collectively activate the plurality of user equipments constituting the single user platform by using the paging message.

To this purpose, an MME managing individual UEs has to recognize other MME which manages different UEs linked to a UE under its management and has to store the context information of the UE under its management and the information of UEs linked thereto.

In other words, MMEs managing linked UEs have to be aware of each other to generate multi-paths for transmitting and receiving data through a plurality of UEs constituting one user platform and activate a plurality of UEs simultaneously through a paging message.

In what follows, it is assumed that individual UEs constituting one user platform are linked to each other, and the same IP address has been allocated to the UEs.

It is further assumed that MMEs managing UEs obtain and store the context information of a managed UE and information related to the UEs linked to the UE (for example, IMSI/GUTI, MME ID, APN, and EPS bearer ID) through an attach procedure.

FIG. 11 is a flow diagram illustrating one example of a method for paging a plurality of linked UEs to which the present invention is applied.

Referring to FIG. 11, when a user platform comprises a plurality of linked UEs which are in the idle state, a paging procedure for changing each UE into the connected state is triggered when a serving gateway (S-GW) corresponding to the EPS bearer path of each UE receives downlink data.

More specifically, a plurality of UEs constituting one platform are linked to each other and transition to the idle state under certain condition to reduce overhead of the network.

When first downlink data to be transmitted to a UE are generated, a packet data network gateway (P-GW) checks whether the generated first downlink data are intended for a UE constituting the user platform S11010.

In other words, the P-GW checks whether the first downlink data are intended for a UE linked to other UEs.

When the first downlink data are not intended for a linked UE, the P-GW transmits the first downlink data to the S-GW corresponding to a UE supposed to transmit downlink data.

However, when the first downlink data are intended for a UE linked to other UEs, the P-GW determines a UE to transmit the first downlink data S11020.

In other words, since the same IP address is allocated to the linked UEs constituting one user platform, the P-GW determines to which UE to transmit the first downlink data among linked UEs.

The P-GW transmits the first downlink data to a first S-GW corresponding to the logical path (for example, an EPS bearer or session) of a determined UE S11030.

The first S-GW which has received the first downlink data transmits a notification message to an MME which manages the determined UE to notify of the occurrence of the first downlink data S11040.

At this time, the notification message may be called a downlink data notification message.

The notification message transmitted from the first S-GW may include the TEID of a determined UE and a session ID (for example, an EPS bearer ID) for identifying a session.

When the corresponding UE is in the idle state, the MME which has received the notification message transmits a paging message to an eNB connected to the UE to change the state of the UE into the connected state S11050.

By transmitting the paging message to the UE in the idle state, the eNB which has received the paging message may change the UE from the idle state to the connected state and after the UE transitions to the connected state, may receive the first downlink data from the first S-GW and transmit the first downlink data to the UE in the connected state.

Afterwards, when second downlink data are generated, the P-GW performs the same procedures as the S11010 and S11020 steps to determine a UE which will transmit the second downlink data S11060, S11070.

In other words, since the same IP address is allocated to the linked UEs constituting one user platform, the P-GW determines to which UE to transmit the second downlink data among the linked UEs.

The P-GW transmits the first downlink data to a second S-GW corresponding to the logical path (for example, an EPS bearer or session) of a determined UE S11080.

The second S-GW which has received the second downlink data transmits a notification message to an MME which manages the determined UE to notify the occurrence of the second downlink data S11090.

At this time, the notification message may be called a downlink data notification message.

The notification message transmitted from the second S-GW may include a session ID (for example, an EPS bearer ID) by which the TEID and session of a determined UE may be identified.

When the corresponding UE is in the idle state, the MME which has received the notification message transmits a paging message to an eNB connected to the UE to change the state of the UE into the connected state S11100.

By transmitting the paging message to the UE in the idle state, the eNB which has received the paging message may change the UE from the idle state to the connected state and after the UE transitions to the connected state, may receive the first downlink data from the first S-GW and transmit the first downlink data to the UE in the connected state.

At this time, if a UE to which the first downlink data has been transmitted and a UE to which the second downlink data has been transmitted constitute the same user platform, namely if the UE to which the first downlink data has been transmitted and the UE to which the second downlink data has been transmitted are linked to each other, a problem is encountered that each UE has to transition to the connected state through a separate paging procedure to transmit the first and the second downlink data meant for providing the same service.

In other words, if the S-GW corresponding to the logical path of each UE fails to receive the data to be transmitted to the UE from the P-GW, a notification message for notifying of an occurrence of downlink data is not transmitted to the MME.

Accordingly, even when there exists data transmitted to a linked UE, if no data is transmitted to each UE, the UE is unable to receive a paging message including the UE's identifier. Therefore, the UE is unable to transition to the connected state but continues to stay in the idle state.

Therefore, if a plurality of data for providing the same service are transmitted to each of different linked UEs, data transmission and reception is blocked until the paging procedure of each UE is completed, thereby leading to a delay in data transmission for providing the same service.

Therefore, to solve the problem above, if UEs constituting the same user platform stay in the idle state, the present invention provides a method for activating the UEs in the idle state through one paging procedure.

FIG. 12 illustrates one example according to the present invention, in which UEs linked to each other and included in a user platform constitute service networks different from each other.

Referring to FIG. 12, when a user platform comprises a plurality of linked UEs which are in the idle state, other linked UE may be changed to the connected state through a paging procedure for changing one UE among a plurality of linked UEs into the connected state.

First, since the S12010 to S12040 steps are the same as the S11010 to S11040 steps of FIG. 11, descriptions thereof will be omitted.

The MME, which has been notified by the first S-W through the S12040 step that first downlink data to be transmitted to a UE has been generated, checks on the basis of the stored context information of the UE whether the UE which has been determined as one to which the first downlink data is to be transmitted is linked to other UE S12050.

In other words, the MME checks whether the determined UE constitutes one user platform by being linked to other UE.

If the UE which has been determined as one to which the first downlink data is to be transmitted is not linked to other UE, the MME may perform the paging procedure to change only the determined UE into the connected state.

However, if the UE which has been determined as one to which the first downlink data is to be transmitted is linked to other UE, the MME determines whether to change not only the determined UE but also other linked UEs from the idle state to the connected state S12060.

At this time, the MME may determine whether to change all of the determined UE and linked UEs into the connected state or to change only the UEs related to a session (for example, an EPS bearer) of the determined UE among the determined UE and linked UEs into the connected state.

For example, as shown in FIG. 10, when the session ID included in a received notification message is Default Bearer 1 for PDN 1 of the S-UE, the MME may recognize that the Default Bearer 1 for PDN 1 of the V-UE is a session related to the Default Bearer 1 for PDN 1 of the S-UE and may determine to change the S-UE and the V-UE into the connected state.

The MME which has determined to change the determined UE and UEs linked to the determined UE into the connected state transmits a paging message to the eNB connected to the determined UE S12070.

The paging message includes not only the identification information of the determined UE but also the identification information of linked UEs of which the states are to be changed to the connected state through the paging message.

If, among linked UEs, there exists a UE managed by a different MME, the MME performs coordination for activating UEs linked to the different MME.

In other words, the MME transmits a message requesting activation of a UE linked to the different MME, and the different MME transmits, to the eNB connected to the UE managed by the different MME, a paging message for changing the linked UE into the connected state.

Afterwards, if second downlink data is generated, the P-GW determines a UE to which to transmit the second downlink data by performing the same procedure as the S12010 and S12020 steps S12080, S12090.

In other words, since the same IP address is allocated to the linked UEs constituting one user platform, the P-GW determines to which UE to transmit the second downlink data among the linked UEs.

The P-GW transmits the second downlink data to the second S-GW corresponding to the logical path (for example, an EPS bearer or a session) of the determined UE S12100.

The second S-GW which has received the second downlink data transmits a notification message notifying the MME which manages the determined UE of the occurrence of the second downlink data S12110.

At this time, the notification message may be called a downlink data notification message.

The notification message transmitted from the second S-GW may include the TEID of a determined UE and a session ID (for example, an EPS bearer ID) for identifying a session.

The MME which has received the notification message does not perform a separate paging procedure since all of the UEs constituting one user platform or all of the UEs linked for providing the same service have been changed to the connected state through the procedure meant for transmitting the aforementioned first downlink data to a UE.

In other words, since all of the linked UEs or all of the UEs for providing the same service among the linked UEs have been changed to the connected state through the S12050 to S12070 steps, the MME does not perform a separate paging procedure even if it receives a notification message notifying of the occurrence of the second downlink data from the second S-GW.

Through the method described above, if linked UEs to which an IP address has been allocated are in the idle state, the states of the linked UEs may be changed into the connected state through one paging procedure; therefore, a delay due to changing a plurality of linked UEs in the idle state into the connected state may be reduced.

FIG. 13 is a flow diagram illustrating one example, in which, when a plurality of linked UEs are in the idle state, a method according to the present invention pages the UEs in the idle state.

Referring to FIG. 13, when a plurality of UEs constituting one user platform are linked to each other, each of the linked UEs may be in a different state from the others depending on a service network.

More specifically, if a UE satisfies a condition as follows, the UE may transition from the connected state to the idle state.

Condition triggered by the eNB: User inactivity, integrity check failure, unspecified failure, or O&M intervention Condition triggered by the MME: Authentication failure A plurality of UEs constituting one user platform may be linked individually according to service networks as shown in FIG. 13.

In other words, S-UE and V-UE 2 are linked according to the service network 1 while S-UE and V-UE1 are linked according to the service network 2.

In this case, depending on the state to which each linked UE currently belong, part of the UEs is in the idle state while another part thereof stays in the connected state.

For example, if data transmission and reception is not occurred for a predetermined time period (for example, inactivity time) between the S-UE and V-UE 2 and service network 1, the aforementioned condition for transitioning to the idle state is satisfied, by which the S-UE and V-UE transition to the idle state.

However, when the S-UE transmits and receives data to and from the service network 2 through a different session, the S-UE does not transition to the idle state, but only the V-UE 1 transitions to the idle state.

In other words, in FIG. 13, the S-UE and the V-UE 2 are kept to the connected state while only the V-UE 1 transitions to the idle state.

In this manner, if only part of a plurality of linked UEs stay in the idle state, the MME may change the UEs in the idle state into the connected state through a paging procedure.

FIG. 14 is a flow diagram illustrating one example, in which, when part of a plurality of linked UEs are in the idle state, a method according to the present invention pages the UEs in the idle state.

Referring to FIG. 14, when downlink data are generated and if none of the linked UEs are in the connected state, the MME may change the linked UEs to the connected state through one paging procedure.

More specifically, if the first v-UE satisfies one of the conditions described with reference to FIG. 13 and transitions to the idle state, the MME which manages the first v-UE checks whether the first v-UE is linked to other UEs.

Afterwards, the MME transmits, to the second S-GW related to a session of the first v-UE, a resource release request message for requesting release of a resource for an eNB which is a downlink endpoint of a data path (for example, an S1 bearer) between the eNB and the second S-GW; and for notifying that the downlink data may not be transmitted to the first V-UE S14010.

Also, through the resource release request message, the MME may notify the second S-GW of a message indicating that the state of the first v-UE and downlink data may not be transmitted to the P-GW and the first v-UE, respectively.

The second S-GW which has received the resource release request message transmits a notification message to the P-GW to notify of release of a path through which downlink data are transmitted to the first v-UE, cause of the release, session ID of the first v-UE, and TEID S14020.

In other words, the notification message transmitted by the second S-GW may include the state of a UE and/or state information indicating release of a path through which downlink data are transmitted to the first v-UE, cause information indicating the cause of release of a path, session ID of the first v-UE, and TEID.

The P-GW which has received the notification message checks whether the first v-UE is linked to other UE and stores the state of the first v-UE and the fact that the state of a path for transmitting downlink data to the first v-UE has been deactivated S14030, S14040.

Through the operation above, the P-GW may recognize the UEs in the idle state among linked UEs constituting the user platform.

Afterwards, when first downlink data to be transmitted to the user platform are generated, the P-GW checks whether the first downlink data generated are meant for linked UEs.

If the first downlink data are not meant for linked UEs, the P-GW transmits the first downlink data to the S-GW related to the session of the corresponding UE.

However, if the first downlink data are meant for linked UEs, the P-GW determines whether there exists a UE in the connected state for transmitting the first downlink data among the linked UEs S14060.

In other words, the P-GW checks whether there exists a UE having an activated data path among the linked UEs.

If none of the UEs are in the connected state, the P-GW determines a UE to transmit the first downlink data among the linked UEs S14070.

In other words, since the same IP address is allocated to the linked UEs constituting one user platform, the P-GW determines to which UE among the linked UEs to transmit the first downlink data.

In what follows, descriptions are given with respect to a case in which the first v-UE is determined as the one to transmit the first downlink data.

The P-GW transmits the first downlink data to the first S-GW corresponding to the logical path (for example, an EPS bearer or a session) of the first v-UE S14080.

The first S-GW which has received the first downlink data transmits a notification message to the MME which manages the first v-UE to notify of the occurrence of the first downlink data S14090.

At this time, the notification message may be called a downlink data notification message.

The notification message transmitted from the first S-GW may include the TEID of a determined UE and a session ID (for example, an EPS bearer ID) for identifying a session.

The MME, which has been notified of the occurrence of the first downlink data to be transmitted to a UE by the first S-GW through the notification message, checks on the basis of the stored context information of the first v-UE whether the first v-UE is linked to other UEs S14100.

In other words, the MME checks whether the first v-UE is linked to other UEs to constitute one user platform.

If the first v-UE is not linked to other UEs, the MME may perform a paging procedure to change only the first v-UE into the connected state.

However, if the first v-UE is linked to other UEs, the MME determines whether to change not only the first v-UE but also other linked UEs into the connected state from the idle state S14110.

At this time, the MME may determine whether to change all of the UEs linked to the first v-UE or only the UEs related to the session (for example, an EPS bearer) of the first v-UE among the UEs linked to the first v-UE into the connected state or to change.

For example, as shown in FIG. 13, if the session ID of the first v-UE included in the received notification message is Default Bearer 2 for PDN 2, the MME may recognize that the Default Bearer 2 for PDN 2 of the s-UE indicates a session related to the Default Bearer 2 for PDN 2 of the v-UE and determine to change the s-UE and the v-UE into the connected state.

The MME, which has determined to change the first v-UE and UEs linked to a determined UE into the connected state, transmits a paging message to an eNB connected to the determined UE S14120.

The paging message includes not only the identification information of the first v-UE but also the identification information of linked UEs to be changed into the connected state through the paging message.

If a UE among linked UEs is managed by a different MME, the MME performs coordination to activate the UE linked to the different MME.

In other words, the MME transmits a message requesting activation of the UE linked to the different MME, and the different MME transmits a paging message for changing the linked UE into the connected state into the eNB to which the UE managed by the different MME is connected.

Afterwards, if second downlink data are generated, the P-GW determines a UE to which the second downlink data are to be transmitted by performing the same procedure as used in the S14050 and S14070 steps above S14130, S14140.

In other words, since the same IP address is allocated to the linked UEs constituting one user platform, the P-GW determines to which UE to transmit the second downlink data among linked UEs.

The P-GW transmits the second downlink data to the second S-GW corresponding to the logical path (for example, an EPS bearer or session) of a determined UE S14150.

The second S-GW which has received the second downlink data transmits a notification message to an MME which manages the determined UE to notify of the occurrence of the second downlink data S14160.

At this time, the notification message may be called a downlink data notification message.

The notification message transmitted from the second S-GW may include the TEID of a determined UE and a session ID (for example, an EPS bearer ID) for identifying a session.

Since the MME which has received the notification message has changed all of the UEs constituting one user platform or all of the UEs linked for providing the same service into the connected state through the procedure for transmitting the first downlink data to the first v-UE described above, the MME does not perform a separate paging procedure.

In other words, since the MME has changed all of the linked UEs or all of the UEs for providing the same service among the linked UEs into the connected state through the S14050 to S14120 steps, the MME does not perform a separate paging procedure even if it receives a notification message notifying of the occurrence of the second downlink data from the second S-GW.

FIG. 15 is a flow diagram illustrating another example, in which, when part of a plurality of linked UEs are in the idle state, a method according to the present invention pages the UEs in the idle state.

Referring to FIG. 15, when downlink data are generated and if some of the linked UEs are in the connected state, the MME may change the linked UEs to the connected state through one paging procedure after transmitting the downlink data to the UEs in the connected state.

First, since the S15010 to S15060 steps are the same as the S14010 to S14060 steps of FIG. 14, descriptions thereof will be omitted.

If some of the linked UEs are in the connected state, the P-GW determines a UE to which first downlink data are to be transmitted among the UEs in the connected state S15070.

In what follows, descriptions are given with an assumption that the determined UE is s-UE.

The P-GW transmits first downlink data to the first s-GW through an activated data path of the s-UE, and the first S-GW transmits the first downlink data to the s-UE through the eNB S15080, S15090, S15100.

Afterwards, the P-GW determines whether to change UEs in the idle state among the UEs linked to the s-UE into the connected state S15110.

For example, the P-GW determines whether to activate the date path of the first v-UE in the idle state, which is linked to the s-UE.

If the P-GW determines to change the first v-UE into the connected state, the P-GW transmits an activation request message requesting re-generation of the data path of the first v-UE to the second S-GW corresponding to a session related to the first v-UE S15120.

The second S-GW requested to re-generate the data path of the first v-UE notifies of activation of the data path of the first v-UE by transmitting a notification message to the MME which manages the first v-UE S15130.

The notification message transmitted by the second S-GW may include the TEID and session ID of the first v-UE.

The MME which has received the notification message changes the first v-UE into the connected state through a paging procedure to activate the data path of the first v-UE.

In other words, the MME transmits a paging message to an eNB connected to the first v-UE S15140.

The eNB which has received the paging message may activate the data path of the first v-UE by transmitting the paging message to the first v-UE in the idle state and thereby changing the first v-UE into the connected state from the idle state S15150.

After the data path is activated, the second S-GW may inform the P-GW of a result of re-generation of the data path through an activation response message S15160, and the first v-UE may receive downlink data transmitted from the second S-GW through the eNB.

After downlink data are transmitted to a specific UE through the method above, even when data meant for providing the same service are transmitted to a different UE linked to the specific UE, the data may be transmitted continuously to the different UE without performing a separate paging procedure and without causing a time delay.

FIG. 16 is a flow diagram illustrating a yet another example, in which, when part of a plurality of linked UEs are in the idle state, a method according to the present invention pages the UEs in the idle state.

Referring to FIG. 16, when downlink data are generated and if some of the linked UEs are in the connected state, the MME may change the linked UEs to the connected state through one paging procedure and transmit the downlink data to the UEs in the connected state.

First, since the S16010 to S16060 steps are the same as the S15010 to S15060 steps of FIG. 15, descriptions thereof will be omitted.

If a UE among linked UEs is in the connected state, the P-GW determines whether to change the UEs in the idle state among the UEs linked to the UE in the connected state into the connected state S16070.

For example, the P-GW determines whether to activate the data path of the first v-UE in the idle state, which is linked to the s-UE in the connected state.

If the P-GW determines to change the first v-UE into the connected state, the P-GW transmits an activation request message requesting re-generation of the data path of the first v-UE to the second S-GW corresponding to a session related to the first v-UE S16080.

The second S-GW requested to re-generate the data path of the first v-UE notifies of activation of the data path of the first v-UE by transmitting a notification message to the MME which manages the first v-UE S16090.

The notification message transmitted by the second S-GW may include the TEID and session ID of the first v-UE.

The MME which has received the notification message changes the first v-UE into the connected state through a paging procedure to activate the data path of the first v-UE.

In other words, the MME transmits a paging message to an eNB connected to the first v-UE S16100.

The eNB which has received the paging message may activate the data path of the first v-UE by transmitting the paging message to the first v-UE in the idle state and thereby changing the first v-UE into the connected state from the idle state S16110.

After the data path is activated, the second S-GW may inform the P-GW of a result of re-generation of the data path through an activation response message S16120.

The P-GW which has received an activation message determines a UE to which the first downlink data are to be transmitted among the UEs in the connected state S16130.

In what follows, descriptions are given with an assumption that the determined UE is s-UE.

The P-GW transmits first downlink data to the first s-GW through an activated data path of the s-UE, and the first S-GW transmits the first downlink data to the s-UE through the eNB S16140, S16150, S16160.

FIG. 17 is a flow diagram illustrating a still another example, in which, when part of a plurality of linked UEs are in the idle state, a method according to the present invention pages the UEs in the idle state.

Referring to FIG. 17, if part of the UEs linked to each other are in the idle state, the MME shares state information of the UEs in the idle state with an MME which manages other UEs linked to the UEs, thereby changing the UEs in the idle state into the connected state.

First, the first v-UE and the s-UE constitute one user platform as shown in FIG. 10 or 13 and are linked to each other.

More specifically, if the first v-UE satisfies one of the conditions described with reference to FIG. 13 and transitions to the idle state, a first MME which manages the first v-UE checks whether the first v-UE is linked to other UEs.

The first MME may recognize from the stored context information of the first v-UE that the first v-UE and the s-UE are linked to each other and the same IP address has been allocated thereto.

The first MME transmits a notification message to a second MME which manages an s-UE linked to the first v-UE to notify that the first v-UE has transitioned to the idle state S17010.

At this time, the notification message may include first state information indicating the state of the first v-UE.

The second MME which has received the notification message from the first MME may recognize that the first v-UE linked to the s-UE has transitioned to the idle state and store the state of the first v-UE.

The second MME transmits, to the first MME, a notification message including second state information indicating the state of the s-UE managed by the second MME S17020.

The first MME may recognize the state of the s-UE linked to the first v-UE through the notification message transmitted from the second MME and store the state of the s-UE.

Afterwards, the second MME checks whether the s-UE is in the connected state S17030.

If the s-UE is in the connected state, the second MME transmits a request message to the eNB S17040, where the request message is used to request the eNB to inform of reception of downlink data if the eNB receives downlink data transmitted to the s-UE managed by the eNB S17040.

Afterwards, if the eNB receives downlink data transmitted to the s-UE from the s-GW, the eNB transmits the received downlink data to the s-UE S17050, S17060.

After transmitting the downlink data to the s-UE, the eNB transmits a notification message for informing of reception of the downlink data transmitted to the s-UE to the second MME S17070.

The notification message transmitted to the second MME by the eNB may include identification information for identifying the s-UE and session ID for identifying a session of the s-UE.

The second MME, which has recognized the occurrence of downlink data transmitted to the s-UE through the notification message transmitted from the eNB, informs that the downlink data have been transmitted to the s-UE linked to the first v-UE by transmitting a notification message to the first MME S17080.

The first MME, which has recognized through the notification message transmitted from the second MME that the downlink data have been transmitted to the s-UE linked to the first v-UE managed by the first MME, checks whether the first v-UE is in the idle state S17090.

In other words, since additional data may be transmitted to the first v-UE to provide a service related to the downlink data transmitted to the s-UE, the first MME checks the state of the first v-UE to change the state of the first v-UE into the connected state if the first v-UE is in the idle state beforehand.

If the first v-UE is in the idle state, the first MME determines whether to change the first v-UE into the connected state.

Having determined to change the first v-UE to the connected state, the first MME transmits a paging message for changing the first v-UE into the connected state to the eNB which manages the first v-UE S17100, and the eNB transmits the paging message to the first v-UE, thereby changing the first v-UE into the connected state S17110.

When part of linked UEs are in the connected state and downlink data are transmitted to the UEs in the connected state, UEs in the idle state but linked to the UEs in the connected state may be changed into the connected state through the method described above.

Also, since UEs in the idle state are changed into the connected state, data may be transmitted and received to and from linked UEs to provide the same service without involving an additional paging procedure.

FIG. 18 is a flow diagram illustrating a further example, in which, when part of a plurality of linked UEs are in the idle state, a method according to the present invention pages the UEs in the idle state.

Referring to FIG. 18, if part of the UEs linked to each other are in the idle state, the MME shares state information of the UEs in the idle state with an MME which manages other UEs linked to the UEs, thereby changing the UEs in the idle state into the connected state.

First, since the S18010 to S18040 steps are the same as the S17010 to S17040 steps of FIG. 17, descriptions thereof will be omitted.

After the S17040 step, if the eNB receives downlink data transmitted from the S-GW to the s-UE, the eNB transmits a notification message for informing of reception of the downlink data transmitted to the s-UE to the second MME S18050, S18060.

The notification message transmitted to the second MME by the eNB may include identification information for identifying the s-UE and session ID for identifying a session of the s-UE.

After transmitting a notification message to the second MME, the eNB transmits received downlink data to the s-UE S18070.

The second MME, which has recognized the occurrence of downlink data transmitted to the s-UE through the notification message transmitted from the eNB, informs that the downlink data have been transmitted to the s-UE linked to the first v-UE by transmitting a notification message to the first MME S18080.

The first MME, which has recognized through the notification message transmitted from the second MME that the downlink data have been transmitted to the s-UE linked to the first v-UE managed by the first MME, checks whether the first v-UE is in the idle state S18090.

In other words, since additional data may be transmitted to the first v-UE to provide a service related to the downlink data transmitted to the s-UE, the first MME checks the state of the first v-UE to change the state of the first v-UE into the connected state if the first v-UE is in the idle state beforehand.

If the first v-UE is in the idle state, the first MME determines whether to change the first v-UE into the connected state.

Having determined to change the first v-UE to the connected state, the first MME transmits a paging message for changing the first v-UE into the connected state to the eNB which manages the first v-UE S18100, and the eNB transmits the paging message to the first v-UE, thereby changing the first v-UE into the connected state S18110.

When part of linked UEs are in the connected state and downlink data are transmitted to the UEs in the connected state, UEs in the idle state but linked to the UEs in the connected state may be changed into the connected state through the method described above.

FIG. 19 is a flow diagram illustrating one example of a method for an MME to which the present invention is applied to change a UE in the idle state into the connected state through a paging procedure.

Referring to FIG. 19, if downlink data are generated to be transmitted to a UE in the idle state, which is managed by the MME, the MME may change not only the UE managed by the MME itself but also other UEs linked to the UE into the connected state.

More specifically, the first MME receives, from a serving gateway, a notification message notifying of an occurrence of downlink data transmitted to a UE in the idle state, which is managed by the first MME S19010.

At this time, the notification message may include the TEID of the UE for identifying the UE and session ID for identifying a session of the UE.

The first MME may store first context information of the UE managed by the first MME itself, and the first context information may include information related to the UE (for example, IMSI/GUIT, MME ID, APN, session ID, and IDs of UEs linked to the UE).

The first MME determines whether there exists at least one UE linked to the UE on the basis of the first context information S19020.

If there exists at least one UE linked to the UE, the first MME performs a paging procedure for changing not only the UE but also at least one UE linked to the UE into the connected state S19030.

In other words, since UEs constituting one user platform are linked to each other, and the same IP address is allocated to the linked UEs, if downlink data for providing a specific service are transmitted to a specific UE among the linked UEs, additional data for providing the same service as the specific service may be transmitted not only to the specific UE but also to other UEs linked to the specific UE.

Therefore, in order not to perform an additional paging procedure, the first MME performs a paging procedure for changing not only the specific UE but also other UEs linked to the specific UE into the connected state.

More specifically, the first MME transmits a paging message for changing a UE and at least one UE linked to the UE into the connected state to the eNB which manages the UE and at least one UE linked to the UE.

The eNB which has received the paging message transmits the paging message to the UE and at least one UE linked to the UE to change the UE and at least one UE linked to the UE into the connected state.

The paging message may include identifiers for identifying the UE and UEs linked to the UE.

At this time, if some UEs among at least one UE linked to the UE are managed by the second MME different from the first MME, the first MME may change the UEs managed by the second MME into the connected state through coordination with the second MME.

Through the method above, the first MME may change not only a plurality of linked UEs managed by the first MME itself but also the UEs managed by the first MME and linked to a UE managed by the first MME itself into the connected state.

FIG. 20 is a diagram illustrating an inner block diagram of a wireless device to which the present invention may be applied.

Here, the wireless device may be an eNB and a UE, and the eNB includes both of a macro eNB and a small eNB.

As shown in FIG. 20, the eNB 2010 and the UE 2020 include communication units (transmitting/receiving units, RF units, 2013 and 2023), processors 2011 and 2021, and memories 2012 and 2022.

The eNB and the UE may further input units and output units.

The communication units 2013 and 2023, the processors 2011 and 2021, the input units, the output units, and the memories 2012 and 2022 are operatively connected with each other in order to conduct the methods as proposed in the present disclosure.

The communication units (transmitting/receiving units or RF units, 2013 and 2023), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 2011 and 2021 implement functions, procedures, and/or methods as proposed in the present disclosure. The layers of radio interface protocols may be implemented by the processors.

The processors may be represented as control parts, controllers, control units, or computers.

The memories 2012 and 2022 are connected with the processors and store protocols or parameters for performing the method proposed in the present disclosure.

The processors 2011 and 2021 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for activating a UE by a first Mobility Management Entity (MME) in a wireless communication system, the method comprising:
receiving a notification message notifying of an occurrence of first downlink data transmitted to a user equipment (UE) managed by the first mobility management entity from a serving gateway (S-GW);
performing a paging procedure for changing (i) the UE and all of a plurality of UEs linked to the UE or (ii) the UE and only a subset of the plurality of UEs linked to the UE into a connected state based on first context information stored in the first MME and based on which sessions of the plurality of UEs are related to a session of the UE,
wherein the first context information includes information on the plurality of UEs linked to the UE,
wherein the UE and all of the plurality of UEs are changed into the connected state through a same paging procedure when all of the sessions of the plurality of UEs are related to the session of the UE, and
wherein the UE and only the subset of the plurality of UEs are changed into the connected state through the same paging procedure when only sessions of the subset of the plurality of UEs are related to the session of the UE.

2. The method of claim 1, wherein a same IP address is allocated to the UE and the plurality of UEs.

3. The method of claim 1, wherein the first mobility management entity stores the first context information and second context information of the plurality of UEs.

4. The method of claim 1, wherein the sessions of the plurality of UEs are related to the session of the UE includes a session for a same packet data network (PDN) that is configured for the UE and the plurality of UEs.

5. The method of claim 1, wherein the performing a paging procedure comprises:
transmitting, to an eNB, a paging message for changing the UE and the plurality of UEs into the connected state.

6. The method of claim 1, wherein the performing a paging procedure comprises:
transmitting, to an eNB, a paging message for changing the UE into the connected state; and
transmitting, to a second mobility management entity managing the plurality of UEs, a request message requesting transition of the plurality of UEs into the connected state.

7. The method of claim 1, further comprising:
transmitting, to the S-GW, a request message requesting release of a resource allocated to the UE, wherein the request message comprises state information indicating a state of the UE.

8. The method of claim 1, further comprising:
when the UE enters an idle state, transmitting first state information indicating a state of the UE to a second mobility management entity managing the plurality of UEs; and
receiving second state information indicating a state of the plurality of UEs from the second mobility management entity.

9. The method of claim 8, further comprising:
when second downlink data transmitted to a specific UE among the plurality of UEs has occurred, receiving an indication message indicating an occurrence of the second downlink data from the second mobility management entity; and
transmitting, to an eNB, a paging message for changing the UE into the connected state.

10. A first Mobility Management Entity (MME) for activating a UE in a wireless communication system, the first MME comprising:
a communication unit transmitting and receiving a radio signal to and from the outside; and
a processor functionally linked to the communication unit, wherein the processor is configured
to receive a notification message notifying of an occurrence of first downlink data transmitted to a user equipment (UE) managed by the first mobility management entity from a serving gateway (S-GW),
to perform a paging procedure for changing (i) the UE and all of a plurality of UEs linked to the UE or (ii) the UE and only a subset of the plurality of UEs linked to the UE into a connected state based on first context information stored in the first MME and based on which sessions of the plurality of UEs are related to a session of the UE,
wherein the first context information includes information on the plurality of UEs linked to the UE,
wherein the UE and all of the plurality of UEs are changed into the connected state through a same paging procedure when all of the sessions of the plurality of UEs are related to the session of the UE, and
wherein the UE and only a subset of the plurality of UEs are changed into the connected state through the same paging procedure when only sessions of the subset of the plurality of UEs are related to the session of the UE.

11. The first MME of claim 10, wherein a same IP address is allocated to the UE and the plurality of UEs.

12. The first MME of claim 11, wherein the processor is configured to transmit, to an eNB, a paging message for changing the UE and the plurality of UEs into the connected state.

13. The first MME of claim 10, further comprising:
a memory, wherein the processor is configured to store the first context information and second context information of the plurality of UEs into the memory.

14. The first MME of claim 10, wherein the sessions of the plurality of UEs that are related to the session of the UE include a session for a same packet data network (PDN) that is configured for the UE and the plurality of UEs.

* * * * *